(12) United States Patent
Karinta et al.

(10) Patent No.: US 9,804,929 B2
(45) Date of Patent: Oct. 31, 2017

(54) CENTRALIZED MANAGEMENT CENTER FOR MANAGING STORAGE SERVICES

(71) Applicant: NETAPP, INC., Sunnyvale, CA (US)

(72) Inventors: Vineeth Karinta, Fremont, CA (US); Santosh C. Lolayekar, Saratoga, CA (US); Alex Gareza Gacos, Daly City, CA (US); Hoshang Bajirao Patil, Santa Clara, CA (US); Martin Rojo, San Mateo, CA (US); Grace Zhanglei Wu, Sunnyvale, CA (US); Balamurali Palaiah, Gilroy, CA (US)

(73) Assignee: NETAPP, INC., Sunnyvale, CA (US)

( * ) Notice: Subject to any disclaimer, the term of this patent is extended or adjusted under 35 U.S.C. 154(b) by 310 days.

(21) Appl. No.: 14/747,357

(22) Filed: Jun. 23, 2015

(65) Prior Publication Data

US 2016/0188621 A1     Jun. 30, 2016

Related U.S. Application Data

(60) Provisional application No. 62/098,601, filed on Dec. 31, 2014.

(51) Int. Cl.
    *G06F 17/30*         (2006.01)
    *G06F 11/14*         (2006.01)
    (Continued)

(52) U.S. Cl.
    CPC ...... *G06F 11/1451* (2013.01); *G06F 11/1446* (2013.01); *G06F 11/1471* (2013.01);
    (Continued)

(58) Field of Classification Search
    CPC ......... G06F 17/30132; G06F 17/30203; G06F 17/30233; G06F 17/3023; G06F 11/1451;
    (Continued)

(56) References Cited

U.S. PATENT DOCUMENTS 6,704,885 B1    3/2004    Salas-Meza et al.
7,926,087 B1    4/2011    Holl, II et al.
(Continued)

OTHER PUBLICATIONS

Non-Final Office Action dated May 25, 2017 for U.S. Appl. No. 14/695,349.
(Continued)

*Primary Examiner* — Greta Robinson
(74) *Attorney, Agent, or Firm* — Klein, O'Neill & Singh, LLP

(57) ABSTRACT

Methods and systems for a storage system are provided. One method includes obtaining network interface information by a processor executable plugin executed by a computing device from a storage system node managing stored information; filtering logical interface information based on a protocol used by a processor executable application that uses the storage system node to store information; obtaining aliases for the logical interface information, when available; and storing the filtered logical interface information and associated aliases at a network identifier cache managed by the plugin; wherein the network identifier cache is used by the plugin to verify network interface information as associated with a data path for a data container stored at a storage device.

20 Claims, 30 Drawing Sheets

(51) Int. Cl.
  *H04L 29/08* (2006.01)
  *G06F 21/62* (2013.01)
  *G06F 11/20* (2006.01)

(52) U.S. Cl.
  CPC .. *G06F 17/30132* (2013.01); *G06F 17/30203* (2013.01); *G06F 17/30233* (2013.01); *G06F 17/30864* (2013.01); *G06F 21/6218* (2013.01); *H04L 67/1002* (2013.01); *H04L 67/1097* (2013.01); *G06F 11/2094* (2013.01); *G06F 2201/80* (2013.01); *G06F 2201/815* (2013.01); *G06F 2201/82* (2013.01); *G06F 2201/84* (2013.01); *G06F 2201/86* (2013.01); *G06F 2221/2113* (2013.01)

(58) Field of Classification Search
  CPC ............. G06F 11/1446; G06F 11/1471; G06F 11/2094; G06F 21/6218; G06F 2201/815; G06F 2201/2113; G06F 2201/86; G06F 2201/84; G06F 2201/82; G06F 2201/80; H04L 67/1002; H04L 67/1097
  USPC .................................................. 707/812, 827
  See application file for complete search history.

(56) References Cited

U.S. PATENT DOCUMENTS

| | | | |
|---|---|---|---|
| 8,429,140 | B1 | 4/2013 | Lolayekar et al. |
| 8,489,811 | B1 | 7/2013 | Corbett et al. |
| 9,197,538 | B2 * | 11/2015 | Hopen ................ G06F 21/6218 |
| 2003/0018657 | A1 | 1/2003 | Monday |
| 2006/0242229 | A1 * | 10/2006 | Kinsey .................. G06F 9/5077 709/203 |
| 2007/0073791 | A1 | 3/2007 | Bruce et al. |
| 2007/0186127 | A1 | 8/2007 | Desai et al. |
| 2007/0217436 | A1 * | 9/2007 | Markley ............. H04L 12/2803 370/401 |
| 2007/0220320 | A1 | 9/2007 | Sen et al. |
| 2008/0120302 | A1 | 5/2008 | Thompson et al. |
| 2008/0320003 | A1 * | 12/2008 | Heinson ........... H04L 29/12066 |
| 2011/0107327 | A1 | 5/2011 | Barkie et al. |
| 2012/0109958 | A1 | 5/2012 | Thakur et al. |
| 2013/0054531 | A1 | 2/2013 | Susairaj et al. |
| 2014/0310679 | A1 | 10/2014 | Bhattacharya et al. |
| 2015/0012571 | A1 | 1/2015 | Powell et al. |
| 2015/0134618 | A1 | 5/2015 | Teterin et al. |
| 2016/0072727 | A1 | 3/2016 | Leafe et al. |
| 2016/0188415 | A1 | 6/2016 | Karinta et al. |
| 2016/0188417 | A1 | 6/2016 | Karinta et al. |
| 2016/0188421 | A1 | 6/2016 | Karinta et al. |
| 2016/0188898 | A1 | 6/2016 | Karinta et al. |

OTHER PUBLICATIONS

Non-Final Office Action dated Jun. 1, 2017 for U.S. Appl. No. 14/747,267.
Non-Final Office Action dated Jun. 2, 2017 for U.S. Appl. No. 14/695,362.
Notice of Allowance dated Jun. 20, 2017 for U.S. Appl. No. 14/747,267.
Non-Final Office Action dated Aug. 12, 2016 for U.S. Appl. No. 14/695,362.
Final Office Action dated Feb. 24, 2017 for U.S. Appl. No. 14/695,362.
Non-Final Office Action on co-pending U.S. Appl. No. 14/695,356 dated Sep. 7, 2017.
Final Office Action on co-pending U.S. Appl. No. 14/695,349 dated Sep. 14, 2017.

* cited by examiner

CENTRALIZED MANAGEMENT CENTER FOR MANAGING STORAGE SERVICES

CROSS-REFERENCE TO RELATED APPLICATION

This patent application claims priority under 35 USC §119 (e) to US Provisional Patent Application Entitled "Centralized Management Center For Managing Services" Ser. No. 62/098,601 filed on Dec. 31, 2014, the disclosure of which is incorporated herein by reference in its entirety.

TECHNICAL FIELD

The present disclosure relates to storage systems and more particularly to, centralized management of storage services for a plurality of applications in different operating environments.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively by different applications, for example, electronic mail (email) servers, database applications, virtual machines executed within virtual machine environments (for example, a hypervisor operating environment) and others to store data, protect the data using backups and cloning. Different applications executed within different computing system types have different requirements for storing information, protecting it by backups and then using restore procedures to restore such backups. Managing stored application objects and providing storage services, for example, backups, restore, cloning and other services in such an environment is a challenge. Continuous efforts are being made to better manage storage services.

SUMMARY

In one aspect, a machine implemented method is provided. The method includes obtaining network interface information by a processor executable plugin executed by a computing device from a storage system node managing stored information; filtering logical interface information based on a protocol used by a processor executable application that uses the storage system node to store information; obtaining aliases for the logical interface information, when available; and storing the filtered logical interface information and associated aliases at a network identifier cache managed by the plugin; wherein the network identifier cache is used by the plugin to verify network interface information as associated with a data path for a data container stored at a storage device.

In another aspect, a non-transitory, machine readable storage medium having stored thereon instructions for performing a method are provided. The machine executable code which when executed by at least one machine, causes the machine to: obtain network interface information by a processor executable plugin executed by a computing device from a storage system node managing stored information; filter logical interface information based on a protocol used by a processor executable application that uses the storage system node to store information; obtain aliases for the logical interface information, when available; and store the filtered logical interface information and associated aliases at a network identifier cache managed by the plugin; wherein the network identifier cache is used by the plugin to verify network interface information as associated with a data path for a data container stored at a storage device.

In yet another aspect, a system having a memory containing machine readable medium with machine executable code having stored thereon instructions is provided. A processor module coupled to the memory is configured to execute the machine executable code of a plugin to: obtain network interface information from a storage system node managing stored information; filter logical interface information based on a protocol used by a processor executable application that uses the storage system node to store information; obtain aliases for the logical interface information, when available; and store the filtered logical interface information and associated aliases at a network identifier cache managed by the plugin; wherein the network identifier cache is used by the plugin to verify network interface information as associated with a data path for a data container stored at a storage device.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for a storage system are provided. One of the methods includes obtaining network interface information by a file system plugin executed by a computing device from a network module of a storage system node operating in a cluster having a plurality of storage system nodes managing stored information; filtering logical interface information based on a file system protocol used by a processor executable application that uses the storage system node to store information; obtaining aliases for the logical interface information, if any, from a domain name server that manages network addresses and aliases for the plurality of storage system nodes; and storing the filtered logical interface information and associated aliases at a network identifier cache managed by the file system plugin; wherein the network identifier cache is used by the file system plugin to verify network interface information as associated with a data path for a data container.

Figure 1A:
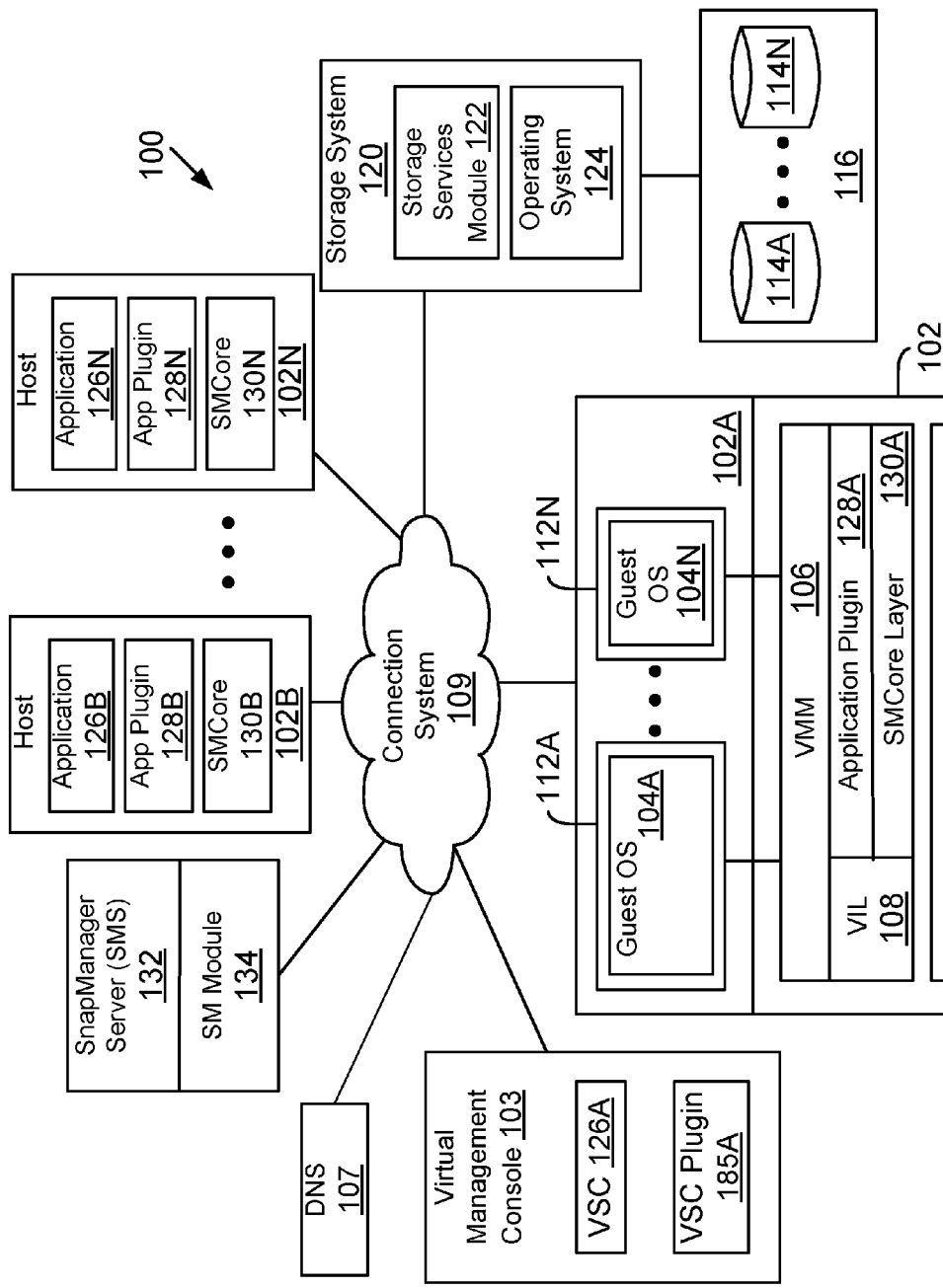
FIG. 1A shows an example of an operating environment for the various aspects disclosed herein.

System 100:

FIG. 1A shows an example of a system 100, where the various adaptive aspects disclosed herein may be implemented. In one aspect, system 100 includes at least a host computing system 102 (shown as host systems 102A-102N and may also be referred to as a host platform 102 or simply as server 102) communicably coupled to a storage system 120 executing a storage operating system 124 via a connection system 109 such as a local area network (LAN), wide area network (WAN), the Internet and others. As described herein, the term "communicably coupled" may refer to a direct connection, a network connection, or other connections to enable communication between computing and network devices.

System 100 also includes a centralized snap manager server (also referred to as "SMS", SM Server, SnapCenter Server or SC Server) 132 that executes instructions for a snap manager module ("SM module") (without derogation of any trademark rights of NetApp. Inc., the assignee of this application) 134 for coordinating storage services related operations (for example, backups, restore, cloning and other operations) for different applications and plugins, as described below in more detail. Although SMS 132 is shown as a stand-alone module, it may be implemented with other applications, for example, within a virtual machine environment, as described below.

It is also noteworthy that SMS 132 is referred to as a snap manager server as an example, and may be referred to or described using different terminology (for example, a central snap server, a central storage services provider and other descriptive terms). The various aspects described herein are of course not limited by how SMS 132 is categorized or the terminology used to describe its innovative functionality, described below in more detail. Furthermore, SMS 132 and the SM module 134 may be referred to interchangeably throughout this specification.

Host systems 102 may execute a plurality of applications 126A-126N, for example, an email server (Exchange server), a database application (for example, SQL database application, Oracle database application and others) and others. These applications may be executed in different operating environments, for example, a virtual machine environment (described below), Windows, Solaris, Unix and others. The applications may use storage system 120 to store information at storage devices 114.

To protect information associated with each application, a plugin module (shown as application plugin 128A-128N) are provided. The term protect means to backup an application and/or backup associated information (including configuration information, data (files, directories, structured or unstructured data) and others (may jointly be referred to as data containers)).

Each host system also executes a snap manager core (also referred to as SMcore) layer 130A-130N (may be referred to as SMcore layer 130 or SMcore layers 130) that interfaces with SMS 132 and the various application plugins for managing backups, restore, cloning and other operations, as described below in detail.

In one aspect, the storage system 120 has access to a set of mass storage devices 114A-114N (may be referred to as storage devices 114) within at least one storage subsystem 116. The storage devices 114 may include writable storage device media such as magnetic disks, video tape, optical, DVD, magnetic tape, non-volatile memory devices for example, self-encrypting drives, flash memory devices and any other similar media adapted to store structured or non-structured data. The storage devices 114 may be organized as one or more groups of Redundant Array of Independent (or Inexpensive) Disks (RAID). The various aspects disclosed are not limited to any particular storage device or storage device configuration.

The storage system 120 provides a set of storage volumes to the host systems 102 via connection system 109. The storage operating system 124 can present or export data stored at storage devices 114 as a volume (or logical unit number (LUN)). Each volume may be configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all of the storage space in multiple storage devices, a RAID group, or any other suitable set of storage space. An aggregate is typically managed by a storage operating system 124 and identified by a unique identifier (not shown). It is noteworthy that the term "disk" as used herein is intended to mean any storage device/space and not to limit the adaptive aspects to any particular type of storage device, for example, hard disks.

The storage system 120 may be used to store and manage information at storage devices 114 based on a request generated by an application executed by a host system or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FC).

In a typical mode of operation, one or more input/output (I/O) commands, such as an NFS or CIFS request, is sent over connection system 109 to the storage system 120. Storage system 120 receives the request, issues one or more I/O commands to storage devices 114 to read or write the data on behalf of the client system, and issues an NFS or CIFS response containing the requested data over the network 109 to the respective client system.

Although storage system 120 is shown as a stand-alone system, i.e. a non-cluster based system, in another aspect, storage system 120 may have a distributed architecture; for example, a cluster based system that may include a separate N—("network") module and D—(disk) module described below with respect to FIG. 9A. Briefly, the N-blade is used to communicate with host platforms 102, while the D-blade is used to communicate with the storage devices 114. The N-blade and D-blade may communicate with each other using an internal protocol.

Alternatively, storage system 120 may have an integrated architecture, where the network and data components are included within a single chassis. The storage system 120 further may be coupled through a switching fabric to other similar storage systems (not shown) which have their own local storage subsystems. In this way, all of the storage subsystems can form a single storage pool, to which any client of any of the storage servers has access.

Storage system 120 also executes or includes a storage services module 122 that coordinates storage volume backups, cloning, restore and replication for different hosts and different applications. Although storage services module 122 is shown as a single block, it may include various modules for taking backups, cloning restore operations, replicating backups from one location to another and so forth.

As described below, backups and other operations may be performed using SMS 132 and snap manager module ("SM module") 134. As an example, taking backups may include taking snapshots, i.e. a point-in-time copy of a storage volume. The point-in-time copy captures all the information in a storage volume. The snapshot may be used to restore a storage volume at any given time.

Storage system 120 also protects snapshots by replicating snapshots stored at a first storage system (may be referred to as primary storage) and replicating it to a secondary storage source. Different technologies, including the SnapVault and SnapMirror technologies of NetApp Inc. (without derogation of any trademark rights of NetApp Inc.) may be used to protect storage volumes.

SnapVault is primarily intended for disk-to-disk backups. SnapVault leverages NetApp Snapshot technology to back up and restore systems at a block level. SnapVault identifies and copies only the changed blocks of a system to secondary storage. SnapMirror takes a mirror copy a storage volume and stores it at a remote location/disaster recovery site. SnapMirror can occur either at volume level or at a Qtree level. Of course, the various techniques described herein are not limited to any specific replication/protection technology.

One or more of the host systems (for example, 102A) may execute a virtual machine environment where a physical resource is time-shared among a plurality of independently operating processor executable virtual machines (also referred to as VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A provides a processor executable virtual machine environment executing a plurality of VMs 112A-112N. VMs 112A-112N that execute a plurality of guest OS 104A-104N (may also be referred to as guest OS 104) that share hardware resources 110. As described above, hardware resources 110 may include CPU, memory, I/O devices, storage or any other hardware resource.

In one aspect, host platform 102A may also include a virtual machine monitor (VMM) 106, for example, a processor executed hypervisor layer provided by VMWare Inc., Hyper-V layer provided by Microsoft Corporation of Redmond, Wash. or any other layer type. VMM 106 presents and manages the plurality of guest OS 104A-104N executed by the host platform 102A.

In one aspect, VMM 106 is executed by host platform 102A with VMs 112A-112N. In another aspect, VMM 106 may be executed by an independent stand-alone computing system, often referred to as a hypervisor server or VMM server and VMs 112A-112N are presented on another computing system.

It is noteworthy that various vendors provide virtualization environments, for example, VMware Corporation, Microsoft Corporation and others. The generic virtualization environment described above with respect to FIG. 1A may be customized depending on the virtual environment provider.

VMM 106 may include or interface with a virtualization layer (VIL) 108 that provides one or more virtualized hardware resource 110 to each OS 104A-104N. VMM 106 also includes or interfaces with a hypervisor plugin (shown as application plugin 128A) and the SMcore layer 130A that are described below in detail.

To manage virtual and physical resources, system 100 may include a virtual center management console (may be referred to as VCenter (provided by Microsoft Corporation) or VSphere (provided by VMWare Inc.) (without derogation of any third party trademark rights) 103. The management console may execute a management application 126A (referred to as virtual storage console (VSC)) for enabling monitoring of host configuration, provisioning of data stores, application cloning as well as backup and recovery services. VSC 126A is used to manage the storage used by the various VMs. A VSC plugin 185A interfaces between the VSC and other components, as described below in detail. The term VSC plugin and hypervisor plugin are used interchangeably. As an example, the VSC plugin 185A may be executed within VMM, for example, as 128A.

In one aspect, system 100 includes a domain name server (DNS) 107. DNS may be a physical machine or executed as a virtual machine. DNS maintains a plurality of data structures (not shown) that store network address (for example, IP addresses and their aliases) associated that are used to access storage system 120. Details of using DNS 107 are provided below.

Figure 1B:
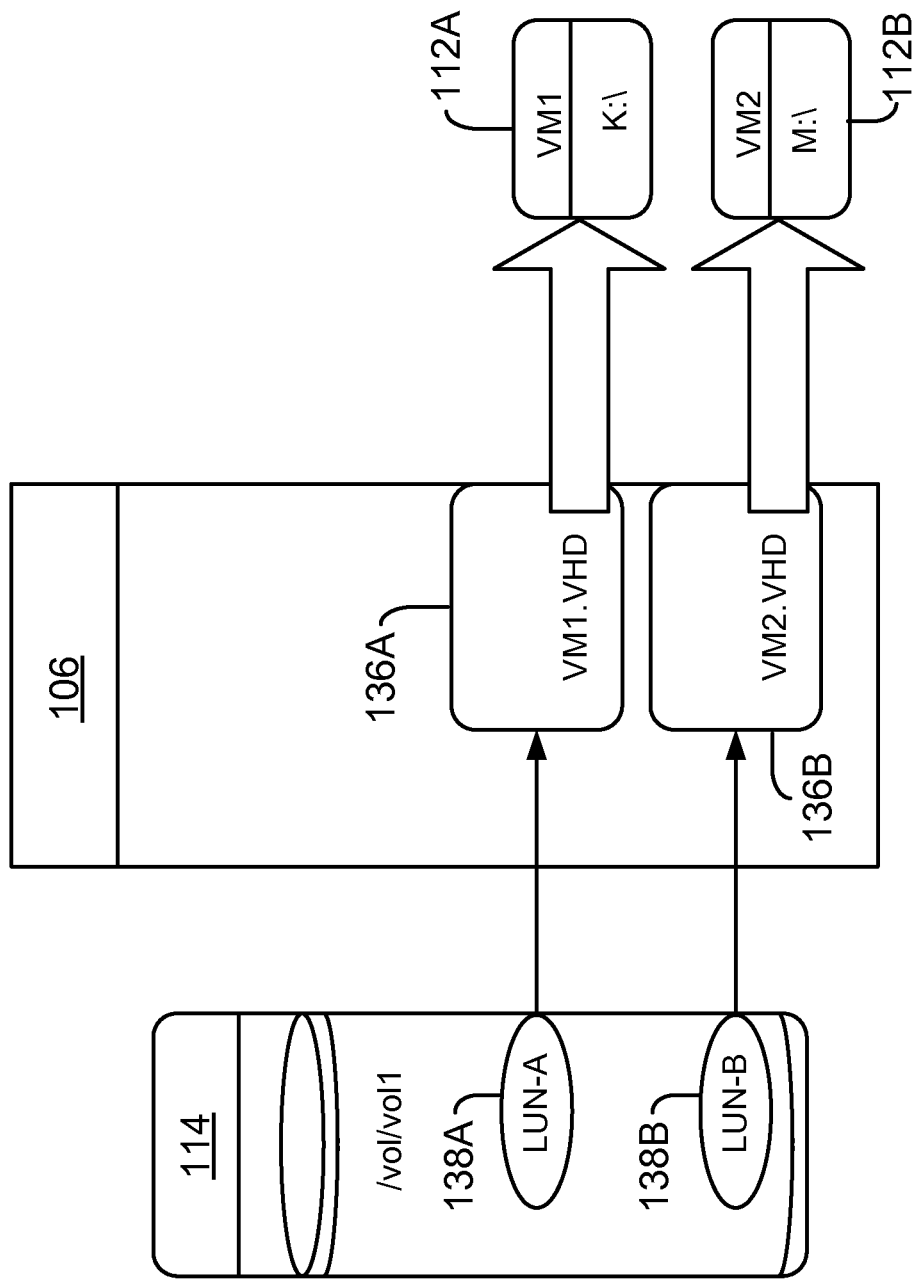
FIG. 1B shows an example of presenting storage space to a virtual machine, according to one aspect of the present disclosure.

Virtual Storage:

Before describing the details of the various aspects of the present disclosure, the following provides an example of presenting logical storage space to one or more VMs with respect to FIG. 1B. Storage system 120 typically presents storage space at storage device 114 as a LUN to VMM 106. For example, LUN-A 138A and LUN-B 138B at storage device 114 for volume "vol1" are presented to VMM 106 that hosts a plurality of VMs 112A (VM1)-112B (VM2).

A file system for example, a NTFS file system (used in a Windows® operating system environment) is created (for example, by the storage system interface 195, FIG. 1D) on the LUNs and one or more virtual hard drive (VHD) files are also generated for each LUN. The user is presented with a storage drive within a virtual machine. For example, the VHD file VM1.VHD 136A is created on LUN-A 138A and then presented as drive K:\ to VM1 112A. VM1 112A uses K:\ to access storage space for reading and writing information. Similarly, VM2.VHD 136B is created on LUN-B 138B and appears as M:\ drive for VM2 112B. VM2 112B uses M:\ drive to store information.

In some instances, a file system for the LUNs is not created by the storage system interface 195 and instead the LUNs are presented directly to the VM as a storage drive. In such a case, the file system may be created by the guest OS. The storage drives in such an instance may be referred to as "pass through" disks. The terms VHD and pass through disks as used herein for presenting a virtual storage drive to a user via a VM are used interchangeably throughout this specification.

Figure 1C:
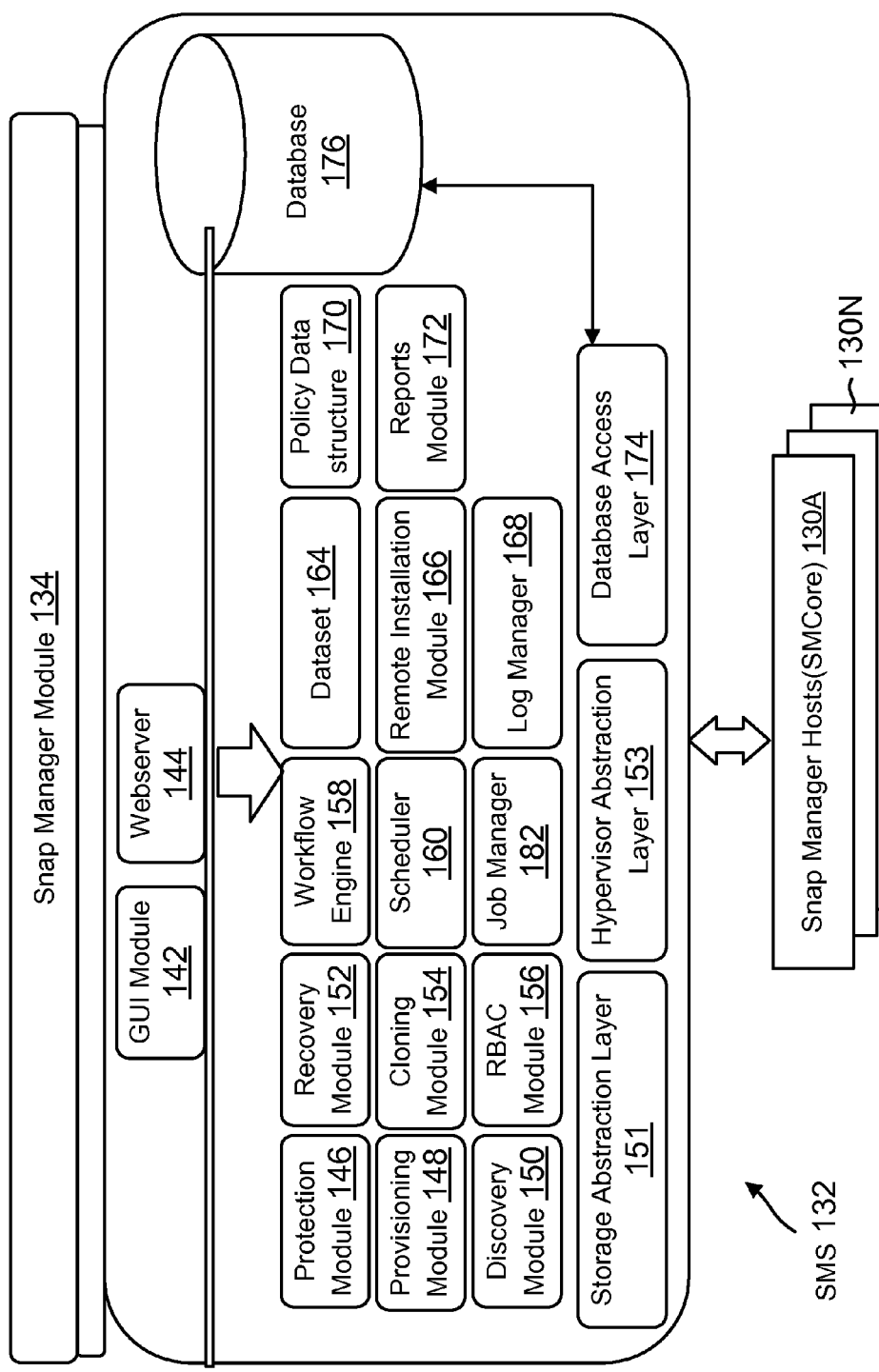
FIG. 1C shows a block diagram of a snap manager (SM) module used by a centralized snap manager server ("SMS") (may also be referred to as SnapCenter Server or SC Server), according to one aspect of the present disclosure.

SMS 132:

FIG. 1C shows a block-level diagram of SMS 132 having a SM module 134, according to one aspect. The SM module 134 may be executed by a stand-alone computing system or may interface or is integrated with another management console/application to manage and interface with multiple of instances of SMcore layers 130A-130N, as described below in detail. SM module 134 may also be implemented as an application within a VM environment.

The SM module 134 includes a graphical user interface (GUI) module 142 that presents a GUI at a display device, for example, a monitor, a smart phone, tablet or any other display device type. The GUIs may be used by different users to interface with SMS 132 and its components. Examples of various GUIs are provided in FIGS. 8A-8T and described below in detail. It is noteworthy that the various aspects described herein are not limited to any specific GUI type because a command line interface (CLI) may also be used to implement the adaptive aspects described herein.

The SM module 134 may also include a web server 144 for enabling Internet based communication. As an example, web server 144 may be implemented as an Internet Information Services (IIS) for a Windows® Server web server (without derogation of any third party trademark rights). The web server 144 interfaces with a workflow engine 158 that coordinates and manages various tasks that are performed by the different components of SM module 134 as described below in detail.

In one aspect, the workflow engine 158 coordinates dataset 164 creation, policy allocation and manage a database 176 that is described below in detail. The workflow engine 158 will also communicate with various SMcore layers 130A-130N for host system related operations, as described below.

In one aspect, the SM module 134 also includes a protection module 146, a provisioning module 148, a discovery module 150, a recovery module 152, a cloning module 154, a role based access control (RBAC) module 156, a storage abstraction layer (may also be referred to as "SAL") 151, a hypervisor abstraction layer (may also be referred to as "HAL") 153, a scheduler 160, a job manager 182, a remote installation module 166, a log manager 168, a policy data structure 170, a reports module 172 and a database access layer 174 that can access the database (or any other data structure type) 176. The database 176 stores various data structures (or objects) in a format that allows SM module 134 to handle storage services for different applications/host systems, as described below in detail.

The log manager 168 collects logs from SMcore layers and the various plugins. The logs can then be presented to a user via a GUI. The logs may be for event management and audit for various SMS 132 operations. The logs may be collected for a job based on a job identifier, as described below.

The protection module 146 is used to enforce a policy for a particular storage services related job (for example, a backup operation). The protection module maintains a protection policy for a plurality of objects (or protection group) that are to be backed up and provides protection service for backing up the protection group objects. Based on an application object, a call is made to an appropriate plugin for providing the appropriate protection service, as described below in detail.

In one aspect, protection module 146 maintains protection group objects for abstract representation of a container of application objects where protection of application objects is defined by policy objects. The protection group objects map to dataset objects 164, as described below in detail.

The provisioning module 148 allows a user to configure and provision a LUN/volume (used interchangeably) that may be used to store information. The provisioning module 148 allows a user to set a LUN size and appropriate permissions for using the LUN, for example, reading and writing data, permission for changing a LUN size, deleting a LUN and other operations. Storage volume information is saved in a standard format at database 176 and includes, name of the storage volume, storage connection identifier (described below), size, a junction path, date volume was created and an aggregate. It is noteworthy that the provisioning module 146 may be a part of another management application, including VSC 126A.

The discovery module 150 interfaces with the SMcore layers 130A-130N executed at different host systems to obtain information regarding the host systems, storage resources used by various applications and information regarding data containers that are protected (i.e. backed up) and unprotected. The discovery module 150 also facilitates discovery and management of application specific objects, for example, VMs, databases, hypervisor and others. Based on the application type, an appropriate plugin is used to discover different objects, as described below in detail.

In one aspect, the discovery module 150 initiates a discovery operation with the SMcore layers. An application programming interface (API) presented by the SMS 132 determines if SMcore layer is installed at a host. If the SMcore is installed, then the SMcore discovers the various plugins at that host. If the SMcore layer is not installed, then the SMcore layer is installed by the remote installation module 166 and the appropriate plugins are installed as well.

To discover application resources, a user is authenticated by SMS 132, as described below. A user token is generated and the same token is then used across multiple hosts to discover application plugin resources as described below in detail.

The cloning module 154 is used to clone storage volumes that are maintained by the storage system 120. The cloning module 154 is also used for managing the life cycle of a clone, as described below in detail. The term clone as used herein is a duplicate copy of a snapshot. The term clone life cycle management means generating a clone, refreshing a clone and deleting a clone based on user defined policies and requirements. Refreshing a clone means deleting an existing clone, generating a new snapshot and then creating the clone again.

RBAC module 156 stores information regarding different clients/entities that are given access to storage. For example, a particular business unit may be allowed to read certain storage volumes and may not be allowed to backup, clone, replicate or delete any storage volumes. RBAC module 156 manages the various roles and access type for different applications that may be executed in different host systems/computing environments.

In one aspect, RBAC module 156 includes an authentication and authorization module. User authentication may happen at multiple end points, for example, via a GUI login, a login API for clients or plugins and others. The authentication module authenticates users against different domain/subsystem requirements, for example, an Active Directory, a local Windows machine host system, open LDAP (lightweight directory protocol) and others. Once a user is authenticated, an encrypted token is generated based on user information. In another aspect, a hash token is generated based on the generated token. The hashed token is saved at database 176. The hashed token may be based on MD5 (Message Digest Algorithm, 5, SHA (secure hash algorithm)-1 or any other technique.

When the authenticated user logs back in, the user passes the token and the SMS 132 decrypts the token, validates the token and regenerates the hash value. The hash value is compared with the stored hash value in database 176.

In one aspect, the authorization module of the RBAC module 156 creates custom roles (for example, a SMS administrator, backup administrator, backup operator, backup viewer, restore administrator and others), modifies existing roles, assigns and unassigns permissions to and from a role (for example, a dataset, policy, host, storage connection, a dashboard, a report, discovery, remote installation and others), assigns and unassigns users to roles and assigns and unassigns resources (for example, hosts, datasets, policy and others).

In one aspect, roles determine a set of capabilities that are available to members of the role. For example, a backup administrator may be allowed to add a host system, install plugins, create a dataset, create a backup dataset, delete a dataset, create policies, delete backups, restore applications and others. A backup operator may be allowed to start and stop existing dataset jobs, monitor backups, view backup reports and perform application level restore operations. A backup viewer may be given read only access to backups, view existing backups and review job session details. A restore administrator may be allowed to perform restore operations using existing backups. The adaptive aspects described herein are not limited to these roles.

In one aspect, once a user is authenticated, the RBAC module 156 performs the following tasks: obtains user information from the token, checks the role that is assigned to the user; checks the permissions associated with the role and then either allows user access or sends an error message if authorization fails.

Figure 1D:
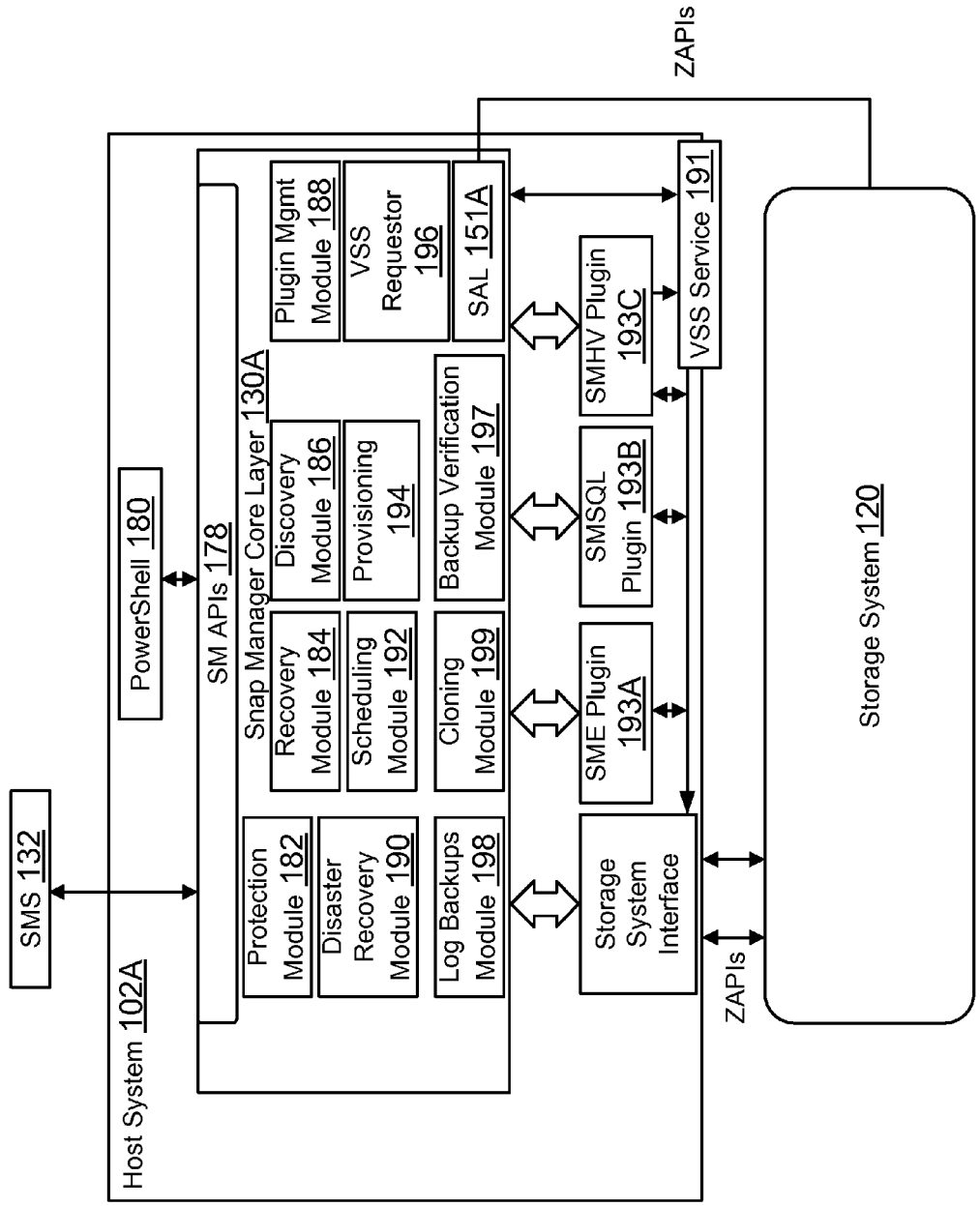
FIG. 1D shows a block diagram of a snap manager core (SMcore) layer used by a computing system (or host system) for interfacing with SMS and other components' of FIG. 1A, according to one aspect of the present disclosure.

In one aspect, storage 120 credentials are assigned to a particular user and maintained by both SMS 132 and SAL 151A (FIG. 1D). SAL 151A uses user credentials based on the user token generated by the RBAC module 156.

In one aspect, SMS 132 ensures that a logged in user token flows to an application for discovery, backup, restore and cloning operations. When a logged in user does not have permission for an operation at the application level, then the application plugin reports that to SMS 132. The resources may then be locked and the user is notified.

All the tasks conducted by the SM module 134 are organized and monitored by the job manager 182. The job schedules are managed by the scheduler 160. When a new job arrives, the job manager 182 stores the job information in a database (for example, 176) with other existing jobs. The job manager 182 creates sub-tasks for executing the appropriate work flows. The sub-tasks depend on the nature of the job (for example, backup, restore, cloning or others). The job manager 182 updates the status of each task to provide real-time updates via a GUI.

The remote installation module 166 downloads an appropriate plugin for an application that is executed by a host system.

In one aspect, the policy data structure 170 is used to store polices for different stored objects (for example, databases, data structures, VMs, storage volumes and others). The policy information is configurable and may be changed by a user. In one aspect, the policy data structure 170 format is the same across different applications. This enables SM module 134 to manage storage services across different platforms with different requirements and operating parameters, as described below in detail. The policy data structure 170 includes various policy objects to store various policies each with a set of attributes that can be applied to any dataset. The policy object stores a policy identifier, a policy name, description, a backup schedule policy, a retention count as to how long a backup is to be retained, a replication policy to replicate a backup from one location to another, types of backups, application consistent backups, and verification policies to verify a backup and others. It is noteworthy that a policy object may be shared across multiple datasets for multiple applications/plugins.

The reports module 172 is used to provide reports to users. The reports may be for different applications and in different formats. An example of different report types are provided below in detail.

In one aspect, the SM module 134 maintains a dataset 164 for different applications and application objects. Each dataset is uniquely identified and named. The dataset format for managing replication for different applications is the same, regardless of how the applications handle information. A dataset may be associated with a policy data structure that defines how an object is to be protected. The dataset format used by the various aspects of the present disclosure allows a user to add or remove stored objects that need to be protected.

Dataset 164 is described below in detail with respect to FIG. 2E. In one aspect, dataset 164 represents a container of application objects where protection attributes may be defined in terms of backup policy, replication profiles and retention policies that are all described below in detail. Dataset 164 is a basic unit that is used to manage backup operations. A user can add any permissible resource to the dataset from multiple host systems/applications.

A database access layer 174 saves information in the database 176. The database 176 may be used to store information that is discovered by the discovery module 150, policy information, host information, datasets and other information.

In one aspect, the database 176 may store various data structures for managing the storage services and providing status to users. As an example, the database schema for the database 176 is application format independent and may include various data structures to identify different host systems to specific login information, a backup metadata structure for storing information regarding backups, a data structure to map backups to stored objects including VMs, databases and others, a data structure for storing information on backup types, i.e. application consistent, full backup, copy backup, log backup for identifying volumes that are involved in each backup, a data structure to track various jobs that are managed by the job manager 182, discovery objects for storing information that is discovered by the discovery module 150, policy data structure 170, storage footprint and storage resource information, a data structure for storing information regarding various plugins, roles, role attributes, storage connections and user information, including credentials.

In one aspect, SAL 151 stores information regarding the various storage resources that are used and available for different hosts. SAL 151 maintains a "storage footprint" for different storage resources (for example, storage systems including storage devices) used by different applications as described below in detail.

In one aspect, HAL 153 is used to communicate with a hypervisor plugin (for example, the VSC plugin 185A) that is used to collect information related to storage used by different virtual machines, as described below in detail.

SMcore Layer 130:

FIG. 1D shows an example of the SMcore layer 130A APIs (178) that can interface with SMS 132, according to one aspect. The SMcore layer includes a protection module 182, a recovery module 184, a discovery module 186, a plugin management module 188, a disaster recovery module 190, a scheduling module 192, a provisioning module 194, a VSS (volume snapshot services) requestor 196, a log backup module 198, a cloning module 199, a backup verification module 197 and SAL 151A.

SAL 151A may be used to communicate with the storage system 120. SAL 151A maintains a storage footprint for each application. SAL 151A interfaces with each plugin to obtain storage resources that are managed by storage system 120 and made available to different applications 126 (FIG. 1A). Details of using SAL 151A are provided below. In one aspect, SAL 151A uses ZAPIs (Zephyr Application Programming Interface) to send and receive data from storage system 120.

In another aspect, the SMcore layer 130A interfaces with storage system 120 via a storage system interface 195. An example of storage system interface is SnapDrive provided by NetApp Inc. (with derogation of any trademark rights of NetApp Inc.).

The SMcore layer 130A interfaces with different types of plugins, for example, a snap manager for exchange (SME) plugin 193A, a snap manager for SQL (SMSQL or "SCSQL" (SnapCenter for SQL) plugin 193B, a snap manager for hypervisor (SMHV or SCHV) plugin 193C (shown above as 128A and VSC plugin 185A) and others. The term plugin as used herein means a hardware processor executable layer that is customized to interface with specific applications. For example, the SME plugin 193A is aware of Exchange format and behavior and provides Exchange specific information to a module of the SMcore layer 130A. Similarly, the SQL plugin understands a SQL database application and its objects and provides that information to the core layer 130A.

The SMHV plugin 193C is able to interface with the hypervisor layer and provides information regarding virtual disks, virtual machines that use the virtual disks and the underlying storage information used by the virtual disks.

In one aspect, the discovery module 186 manages discovery of plugins and the resources that are used by each plugin. A consistent format is used for maintaining plugin information. For example, a standard schema is used to manage plugin information. The schema includes a unique plugin identifier (PluginID), a plugin name, a plugin version, a plugin install path, a description, a vendor name that provided the plugin, date a plugin was created and modified and a URL. The schema in conjunction with the object format (referred to as SMobject) described below allows discovery module 186 to obtain plugin information and provide it to SMS 132. To discover resources, the SMS 132 interfaces with the SMcore 130. The discovery module 186 of the core communicates with the respective plugin and obtains plugin information, as described below in detail.

The protection module 182 is used for applying policy for backup operations at a host system level. The recovery module 184 allows the core layer 130A to recover or restore a stored object from a snapshot copy. The plugin management module 188 is used to interface with SM module 134 to receive the proper plugins. For example, if a host system only uses Exchange, then the host system may need the SME plugin 193A. The plugin management module 188 provides the application information to the SM module 134 so that the appropriate plugin can be provided.

The disaster recovery layer 190 coordinates disaster recovery with SM module 134 and the storage system 120, when there is a disaster and a snapshot needs to be recovered from a remote, secondary site where information is replicated.

The scheduling module 192 is used for coordinating backup, restore and cloning related operation schedules, as described below in detail.

The provisioning module 194 is used to provision storage via a GUI. The provisioning module 194 provides information to the SM module 134 that presents the GUI to a user. In another aspect, the GUI may be presented by host system 102A and the provisioning module 194 provides provisioned information to the SM module 134.

The VSS requestor module 196 (shown as VSS requestor) requests snapshots in a Windows Operating system environment. The VSS requestor 196 then interfaces with VSS service 191 that interfaces with the storage system 120 to execute the snapshot operations.

The backup verification module 197 verifies a backup or replication operation. Since different applications may have different requirements, the backup verification module 197 facilitates the verification for different applications, as described below in detail.

The cloning module 199 that assists in cloning a snapshot and a log backup module 198 that assists in backing up logs. As an example, a database application may maintain a log to track changes to a database and the log backup module 198 assists in backing up those logs.

Figure 1E:
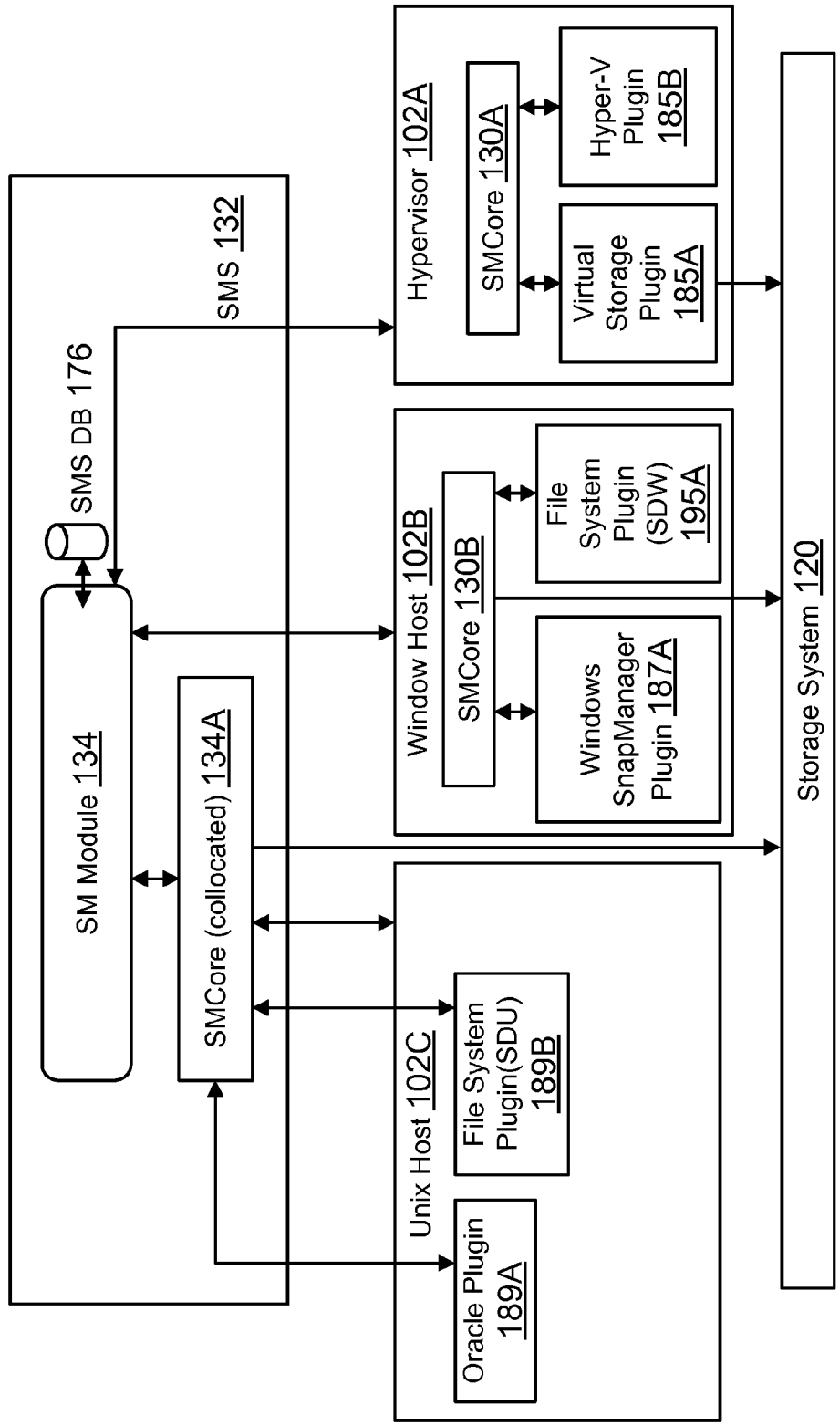
FIG. 1E shows an example of different host systems interfacing with the SMS of the present disclosure.

FIG. 1E shows an example of SMS 132 with the SM module 134 having a collocated SMcore layer 134A for interfacing with different plugins. For example, a Windows based host system 102B with SMcore layer 130B interfaces with the SMS 132. The Windows host 102B includes a Windows Snap manager plugin 187A and a file system plugin 195A. The Windows Snap manager plugin 187A interfaces with Windows based operating systems or applications for providing storage services through SMS 132. The file system plugin 195A is provided for a Windows based file system used for managing data objects in a Windows operating environment. Plugin 195A interfaces with the storage system interface 195 to communicate with the storage system 120. In another aspect, the plugin 195A interfaces with the storage system 120, as described below in detail.

The hypervisor (or host) 102A includes a virtual storage plugin 185A and a hyper-v plugin 185B (similar to 193C, FIG. 1C). The hyper-V plugin is used in a Hyper-V virtual environment. The virtual storage plugin 185A interfaces with the storage system 120 to obtain storage information associated with virtual storage that is presented to virtual machines. The hyper-V plugin 185B is used to interface with the Hyper-V layer executed within host 102A. This allows the SMcore layer 130A to develop a storage footprint involving virtual and physical storage in a virtual machine environment.

A UNIX host 102C includes a plugin 189A that understands an Oracle database and a file system plugin 189B that understands the UNIX file system. The plugins interface with the SMS 132 for protecting databases in a UNIX environment. For example, plugin 189B interfaces with the storage system interface 195 to communicate with the storage system 120. In another aspect, file system plugin 189B may communicate directly with the storage system 120.

Figure 2A:
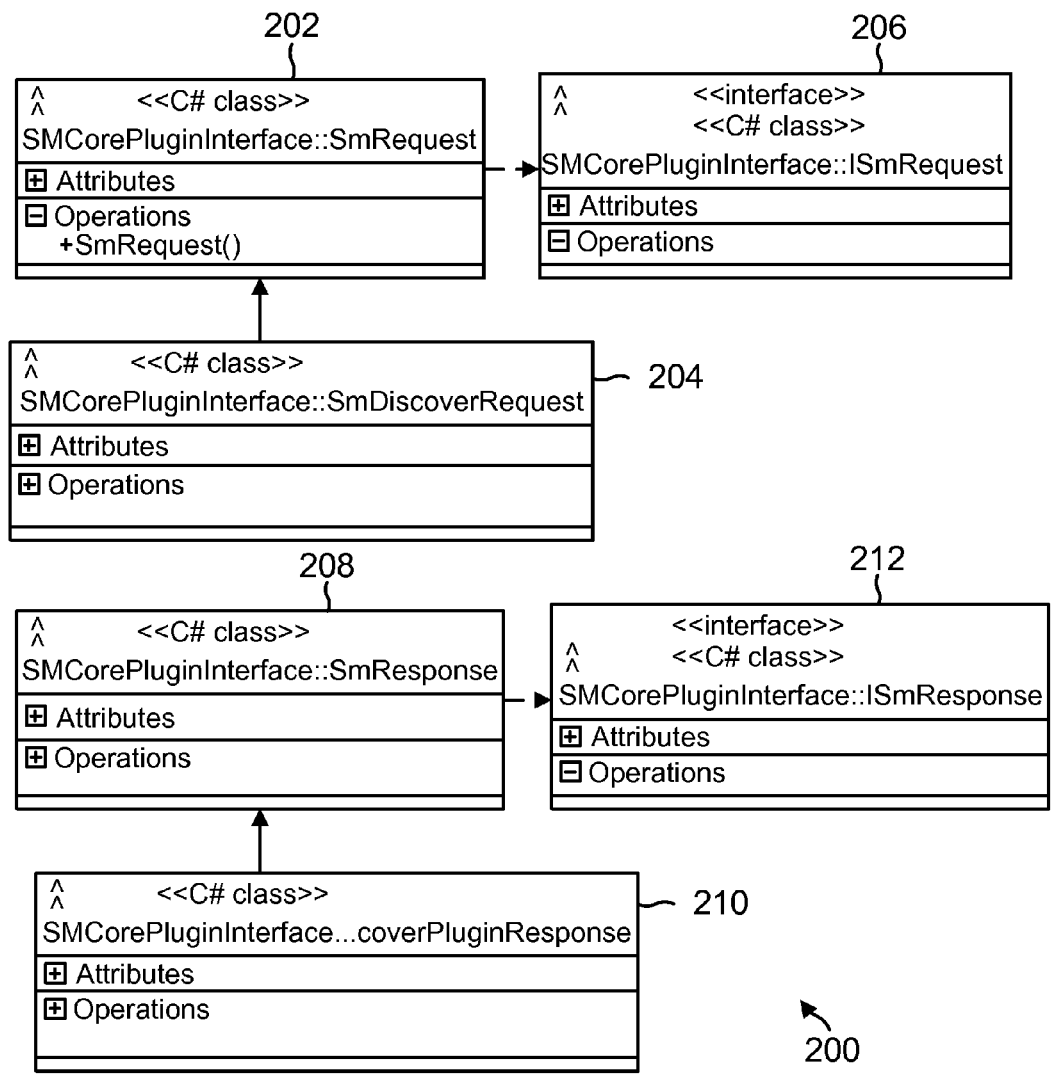
FIG. 2A shows an example of a request and response format for communication between the SMS and SMcore layers, according to one aspect of the present disclosure.

Format 200:

FIG. 2A shows a platform and application independent format 200 used by the SM module 134 and the SMcore layers 130 for exchanging information and then storing the information in database 176, according to one aspect. In one aspect, regardless of which application data is being protected/managed, the system uses a request/response model format for obtaining and storing information regarding different applications using the various plugins. As an example, the objects used by format 200 comply with the REST (Representational State Transfer) API model.

Format 200 shows a base class 202 for a snap manager request. The base class object is defined by its attributes that are described below. The base class includes a payload that determines what operation needs to be performed. Object 204 is used to define the base class 202, which in this case is a discovery request. Based on object 202, an interface object 206 is defined that may be used for providing discovery information.

Each SM request object includes a job object for a particular request. The job object may be used to show the details of a specific job, regardless of what application and environment is using a particular storage service. For each response, there is associated a response object. This is shown as object 210, where the base class for the response is 208. The response interface, similar to request interface is shown as 212.

Figure 2B:
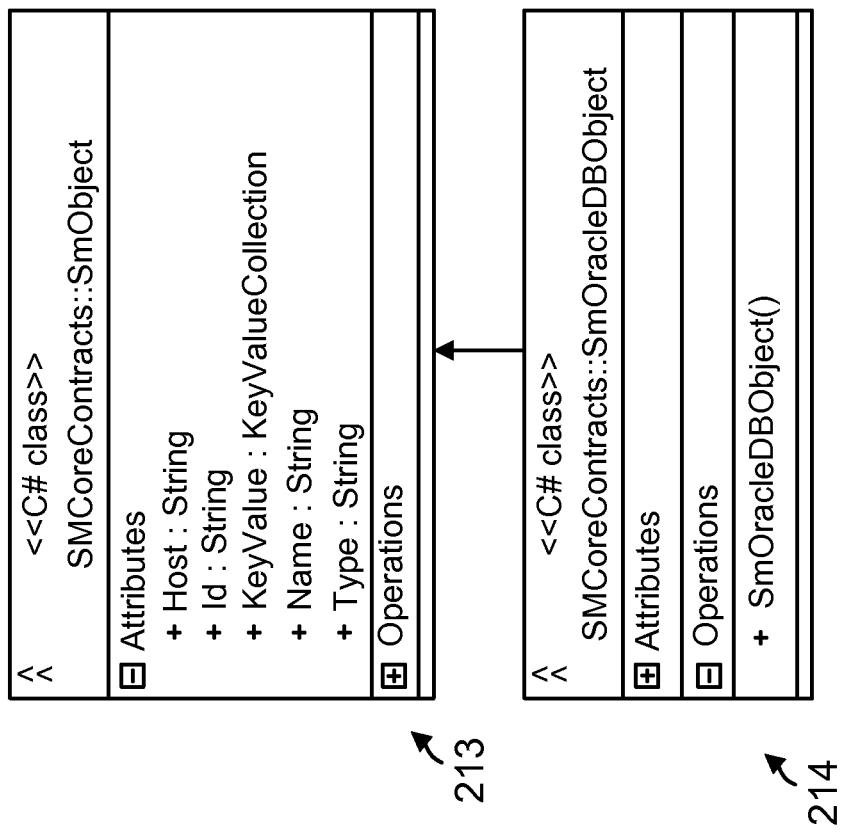
FIG. 2B shows an example of an object format used by SMS to store information regarding different applications, according to one aspect of the disclosure.

FIG. 2B shows an example of an object 213 (shown as SmObject) that may be used for a request or a response, according to one aspect. Object 213 is an abstract representation of an application object. Object 213 format allows SMcore modules to communicate and interface with other components in a format independent manner that does not depend on an application type. As an example, object 213 may be used for a response. Object 213 is based on details that are included within object 214 that in this example, may be an Oracle database object.

SM object 213 includes various attributes. For example, object 213 identifies a host system where the object or application may be running. The object has a unique identifier shown as object ID. Object 212 includes a "key value" pair for the object. The key value pair may be used by a plugin and may include any information.

The object 213 may also include a unique name and a field that defines an object type. For example, the object type may be a database object, an object that provides information regarding virtual machines and other object types. The operations segment of object 213 is populated by object 214.

In one aspect, object 214 may be used to represent any application type. This allows the SM module 134 to manage and protect information regarding different application types, as described below in detail.

Figure 2C:
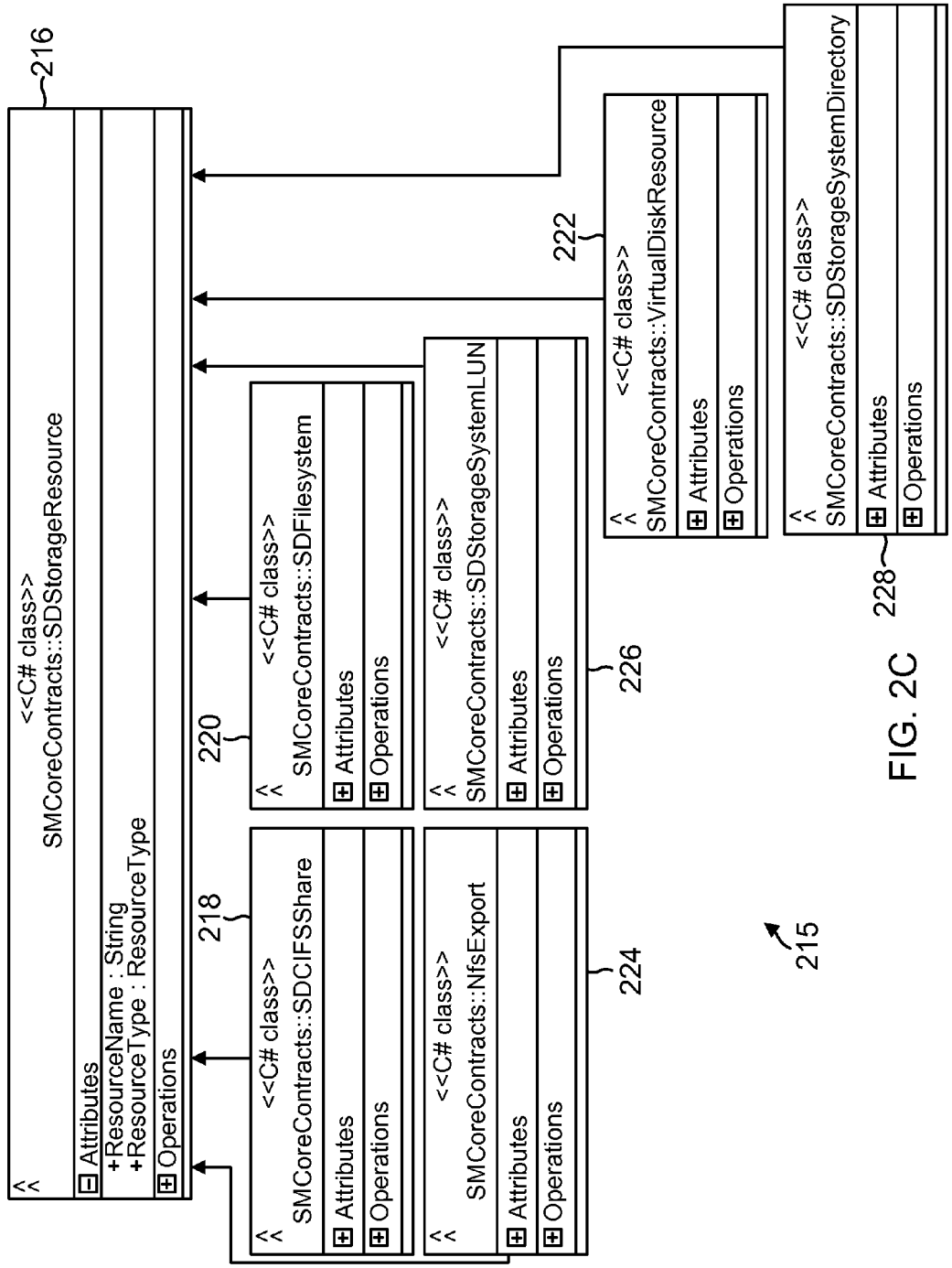
FIG. 2C shows a storage layout maintained by SMS to provide storage services, according to one aspect of the present disclosure.

Storage Footprint:

FIG. 2C shows an example of storage footprint 215 that is maintained by SAL 151 at SM module 134 and/or SAL 151A, according to one aspect. SAL 151 obtains information from SAL 151A of each SMcore layer 130 that is aware of each host system operating environment. In one aspect, information regarding different storage devices/objects is maintained in a standard format. This enables SM module 134 at SMS 132 to manage storage services related to different storage device types and storage protocols, as described below in detail.

The storage footprint 215 may be stored as an integrated stored object 216 that includes storage information for different storage device/protocol types. For example, object 216 includes information regarding a CIFS share represented by object 218, a host file system that is backed up in a SAN storage represented by object 220, a virtual disk resource 222 that is deployed in a virtual machine environment, a NFS based storage represented by object 224, a storage system LUN represented by object 226, and a NFS and CIFS system level directory represented by object 228 that is represented by object 228. By managing storage resources that are used by disparate applications and environments, SM module 134 can efficiently manage storage services for such applications and environments, as described below in detail.

SAL 151 abstracts storage information and stores the storage information as object 215. This allows SM module 134 to replicate, clone and restore information regardless what storage system type, storage device type or file system protocol that is used for storing information.

In one aspect SAL 151 (and 151A) may be implemented as an API that is used for backups, restore, cloning and provisioning operations for different applications, without having the applications getting involved with the semantics of storage system 120. SAL 151 (and 151A) abstracts storage specific technology decisions, for example, whether to use snapshot or single instance storage (SIS clone) for backup and mounting, as described below in detail.

Figure 2D:
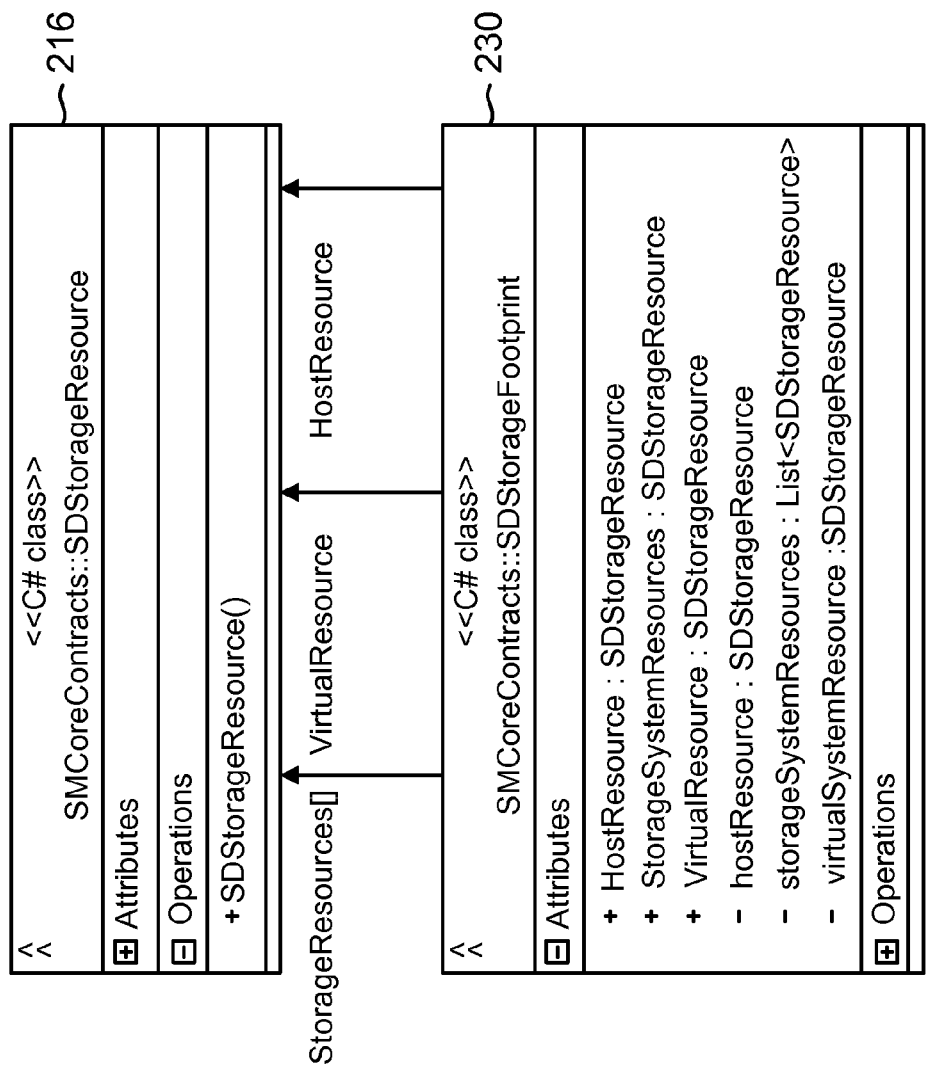
FIG. 2D shows an example of a storage resource object, according to one aspect of the present disclosure.

FIG. 2D shows an example of a storage footprint object 216. Object 216 is based an object 230 that provides information regarding host system storage resources, storage system resources, virtual machine environment storage resources and others. It is noteworthy that object 216 format is similar to the format 200 described above in detail.

In one aspect SAL 151 (and SAL 151A) are used for volume management, LUN management, initiator group ("igroup", where an igroup identifies a list of initiators (or adapter ports) that are allowed to access a LUN or a storage volume) management, snapshot management, mounting snapshots, clone management, replication management and other operations.

For volume management, SAL 151/151A may be used to retrieve volume information from storage system 120, provision a volume, create a volume clone, set a state for a volume and dismount a volume. For LUN management, SAL 151/151A facilitates creating a new LUN, delete a LUN, retrieving LUN information, mapping a LUN to an igroup, retrieving LUN mapping information, getting LUN attributes, setting LUN attributes, getting LUN details including LUN size, enabling LUN resizing, taking a LUN online or offline, getting a LUN path information, creating a target LUN, renaming a LUN and other information.

Igroup management, includes getting igroup information for a LUN/storage system, adding initiators to an igroup, binding an igroup to a port set, renaming an igroup and removing an igroup.

Snapshot management includes creation of a snapshot, removing a snapshot, restoring a snapshot, cloning a directory, performing a file based restore or volume based restore, getting a list of snapshots for a volume, renaming snapshots, mounting a LUN from a snapshot and dismounting a LUN from a snapshot.

Replication management includes setting SnapMirror/Vault information, getting replication status, setting policy rules for replications, removing a retention policy and other operations.

Figure 2E:
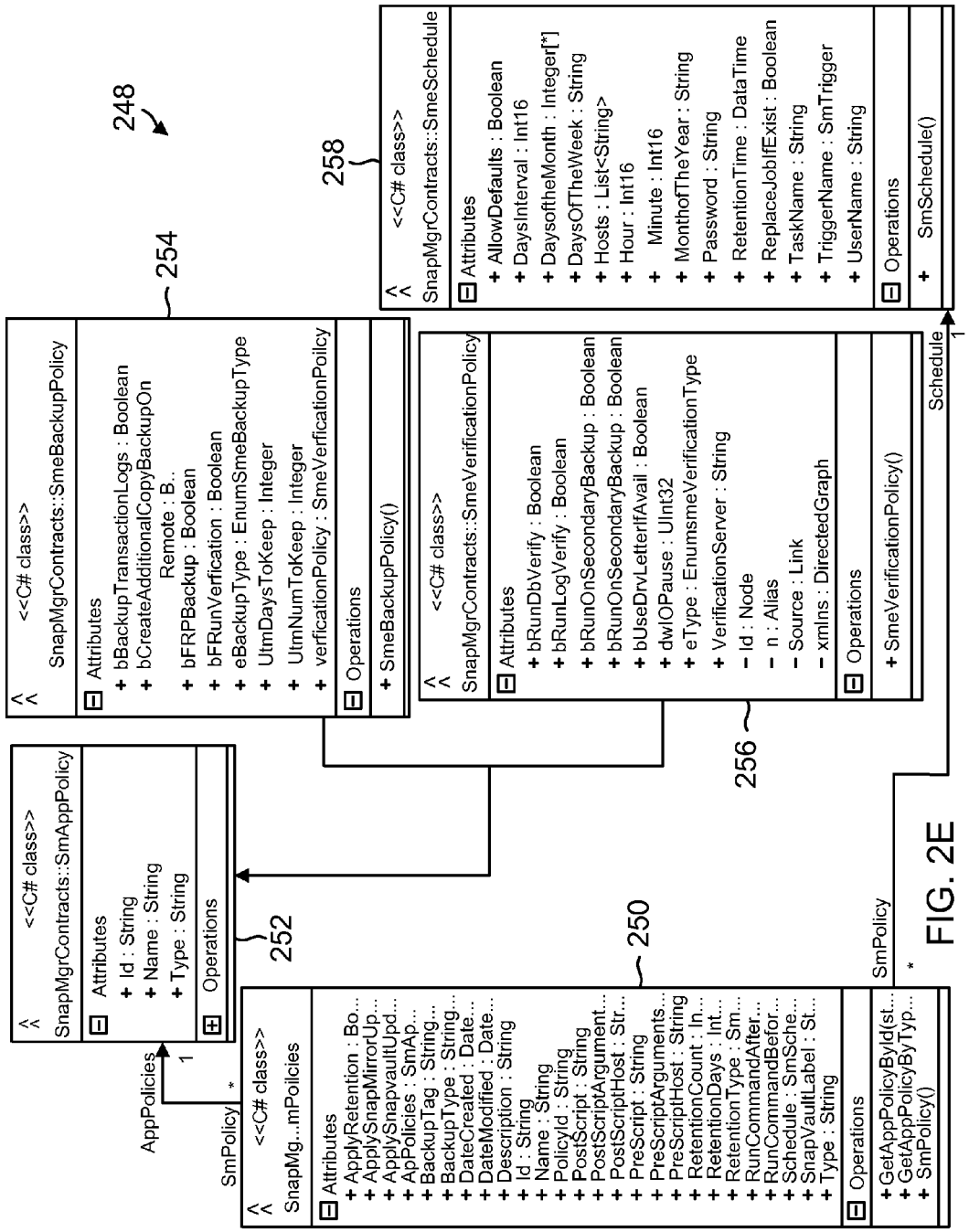
FIG. 2E shows an example of a dataset object maintained by the SMS for providing storage services, according to one aspect of the present disclosure.

Dataset 248:

FIG. 2E shows an example 248 (similar to 164, FIG. 1C) for maintaining a dataset, according to one aspect of the present disclosure. As mentioned above, a dataset is an abstract representation of a container for application specific objects for executing a storage services related operation, for example, a backup operation, a clone life cycle operation and others. Briefly, a dataset is an independent unit for defining and managing backup operations. A user can add resources from multiple hosts and applications that are managed by SM module 134 to a dataset.

The dataset may be used to define protection attributes as defined by a backup policy, a retention policy that defines for how long a backup is retained and replication profiles and others. Examples of protection attributes include, defining when a backup is taken, the type of backup (i.e. full backup or a selective backup of log files); update policy that defines when the backup is updated; retention count may be defined as older than a certain number of days and count based i.e. after a certain number of backups, backups are deleted. The attributes may also be used to define if there needs to be a specific verification for the backup, for example, one dictated by SQL and Exchange servers.

In FIG. 2E, the high-level policy examples are shown as object 250. These policies may be applied for any application. The application level or specific policy is shown as object 252 that is based on objects 254 and 256. For example, object 254 defines the policy parameters for backing up an Exchange server. Object 256 defines the policy for verifying the backup. Object 258 defines the backup schedule that is maintained by the scheduler 160 of SM module 134. By managing storage services via a standard dataset format, SMS 132 is able to efficiently manage backup, clone, restore and other operations for different hosts, VMs, applications and plugins. Example of generating datasets is provided below in detail.

Figure 2F:
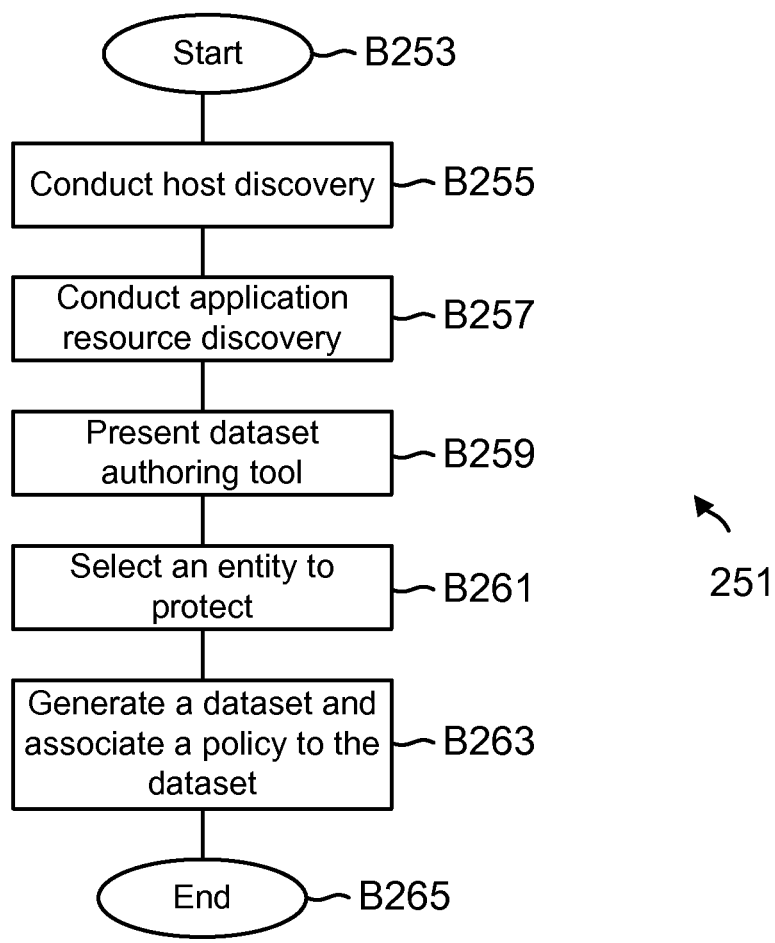
FIG. 2F shows a process flow for creating a dataset, according to one aspect of the present disclosure.

FIG. 2F shows a process 251 for generating a dataset, according to one aspect of the present disclosure. The process begins in block B253, when a host system is discovered. The host may be discovered by SMS 132 or added via a user interface. As an example, hosts within a subnet may be automatically discovered by sending a discovery packet. SMS 132 stores host information as part of database 176. Each host is uniquely identified and if the host is part of a group, then the host group is also uniquely identified. SMS 132 also stores a network access address (for example, the IP address) that is used to access the host, a port identifier used to connect with the host, a cluster node identifier, if the host is a part of a cluster, a description of the host, and the date it is created and modified. This schema is consistent for all host types.

The SMS 132 communicates with the host to determine if a SMcore layer 130 is installed. When the SMcore is already installed, then the appropriate SMcore layer 130 discovers the associated plugin. If the SMcore layer is not installed, then it is installed with one or more plugins.

In block B257, SMS 132 discovers the resources used by the plugins via SMcore layer 130. Details of the application resource discovery are provided below.

In block B259, the user is presented with a dataset authoring tool via a GUI. In block B261, the user selects an entity (for example, a database) that it wants to protect. The entity may be all the data associated with an application or a sub-set of the data.

In block B263, a dataset is generated and associated with a policy. As described above, the dataset includes core policy attributes (for example, 250) and application specific policy (for example, 254 and 256). The process then ends in block B265.

Figure 3A:
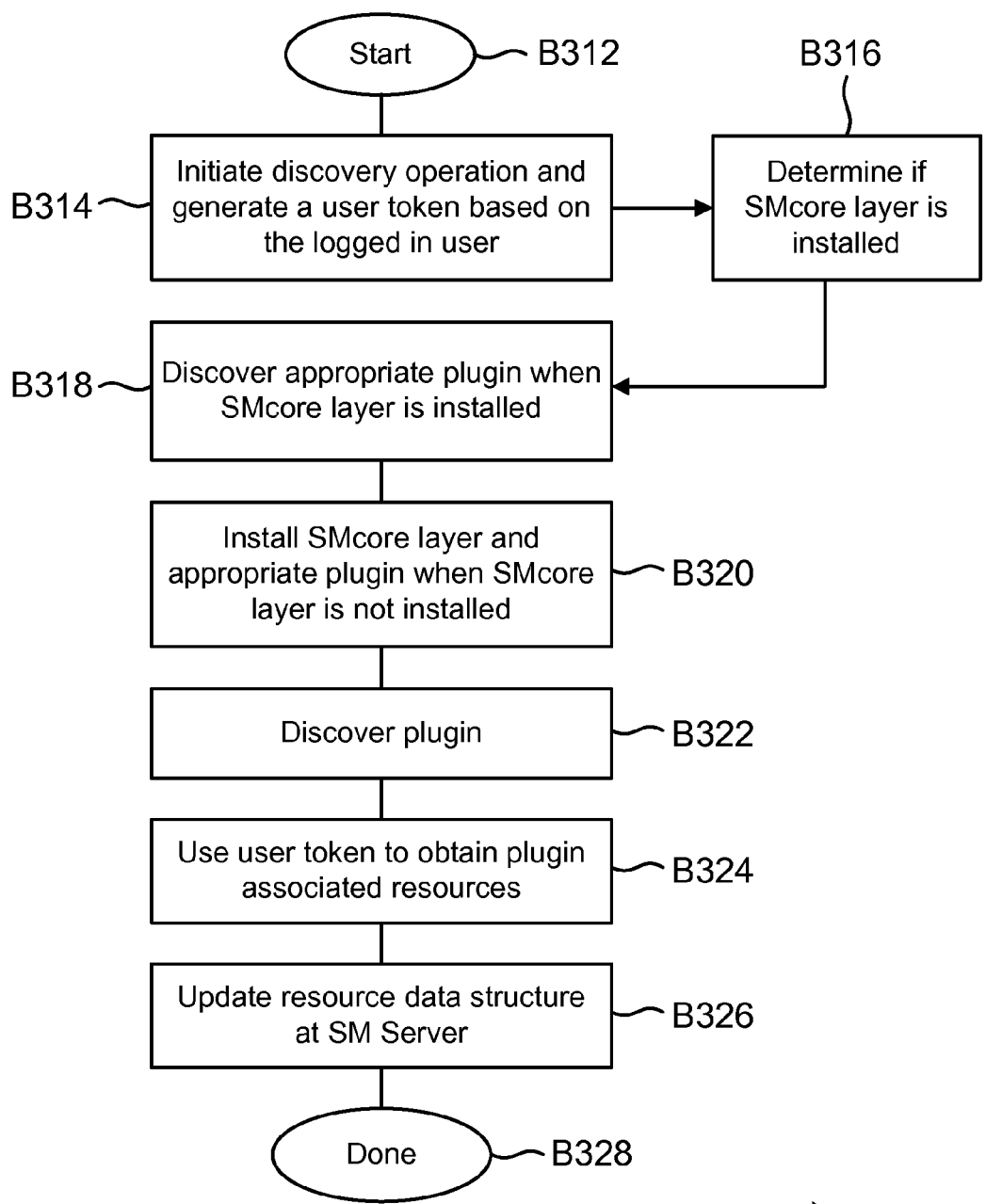
FIG. 3A shows a discovery process flow, according to one aspect of the present disclosure.

Resource Discovery:

FIG. 3A shows a process 310 for determining host and application resources by SMS 132 from different applications, storage system 120 and other modules of system 100, according to one aspect. The discovery process uses the request/response format described above with respect to FIGS. 2A-2B such that discovery is not affected by individual application formats/requirements.

The discovery is initiated in block B314 by SMS 132 and based on a logged in user, a user token is generated. In one aspect, the token is a unique identifier for a specific user and for a specific discovery operation. The token is then used across different platforms for obtaining information. In one aspect, the RBAC module 156 performs authentication for the user and generates the token. The token may be encrypted and provided to the user. The RBAC module 156 stores a hash value for the token at database 176 for future authentication.

In block B316, SMS 132 determines if an instance of the SMcore layer 130 is installed at a host system it is communicating with. This may be determined by the discovery module 150 that sends out a discovery request. If a response is received by the discovery module 150, then SMS 132 assumes that the SMcore layer 130 is installed.

If the SMcore layer 130 is installed, then the SMcore 130 discovers the appropriate plugin that is being used by the host system. The plugins are discovered by the SMcore layer 130 and provided to SM module 134. In one aspect, SMS 132 stores at least the following information regarding each plugin: a unique plugin identifier (PluginID, a plugin name, a plugin version, a plugin install path, a description, a vendor name that provided the plugin, date a plugin was created and modified, a URL, a host-plugin relationship, a host identifier associated with the plugin and the date the plugin information object was created.

If the SMcore layer is not installed, then in block B320, the SMcore layer 130 is installed at the host system. The appropriate plugin is also installed. The type of plugin will depend on the host system applications. For example, if the host is a Unix system managing an Oracle database, then the plugin is the Oracle plugin 189A. Similarly, for a Windows environment, the plugin is Windows Snap manager plugin 187A. For a virtual environment, plugins 185A and 185B are installed. The installed plugin are discovered in block B322.

In block B324, the user token is provided to the SMcore layer 130. The SMcore layer 130 then passes the token to the installed plugin(s). The plugins then pass the discovery request to the appropriate application. For example, if the request involves virtual machine storage resources, then the hypervisor plugin will request the storage resources from the hypervisor and the virtual storage plugin will request the resources from the storage system. This allows the SMcore 130 to obtain details regarding both the virtual and physical storage. The discovered resources are then provided to SMS 132 in block B326. Database 176 is then updated to store the discovered information. In one aspect, regardless of the application type, the data is stored in the format shown in FIG. 2C and described above.

Figure 3B:
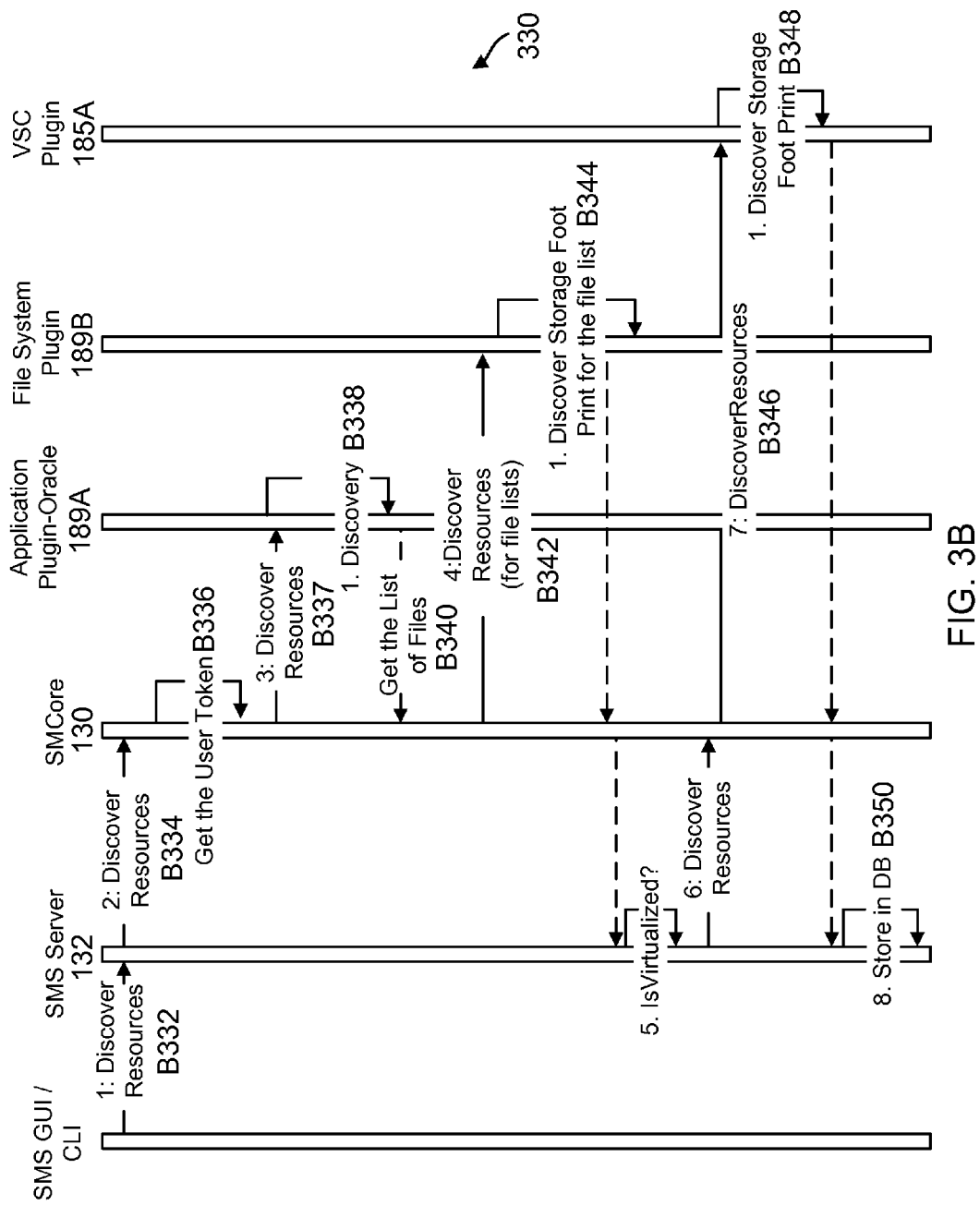
FIG. 3B shows a process for resource discovery involving different applications, plugins and the SMS, according to one aspect of the present disclosure.

FIG. 3B shows an example of a process 330 showing resource discovery involving different applications, plugins and the SMS, according to one aspect of the present disclosure. As an example, the process begins in block B332, when a discovery request is received by the SMS 132. The request may be generated from a GUI or a CLI. In block B334, the SMS 132 generates a unique user token for the discovery request. In block B336, the token with the discovery request is sent to the appropriate SMcore layer 130. The request format is the same regardless of what plugin or application is involved.

In blocks B337 and B342 the SMcore layer 130 sends a discovery request to the Oracle application plugin 189A and the file system plugin 189B, respectively, when storage is not virtualized. The application plugin 189A provides a list of files that need to be discovered in block B340. The file system plugin 189B provides the storage footprint for the list of files in block B344, as described below with respect to FIG. 3C.

When storage is virtualized, as determined in block B345, a discovery request is sent to the VSC plugin 185A (or any other hypervisor plugin that may be appropriate for the virtual environment). The plugin conducts discovery in block B348 to obtain both virtual storage and physical storage information and provides the same to SMS 132. In block B350, the storage information is then stored at database 176.

Figure 3C:
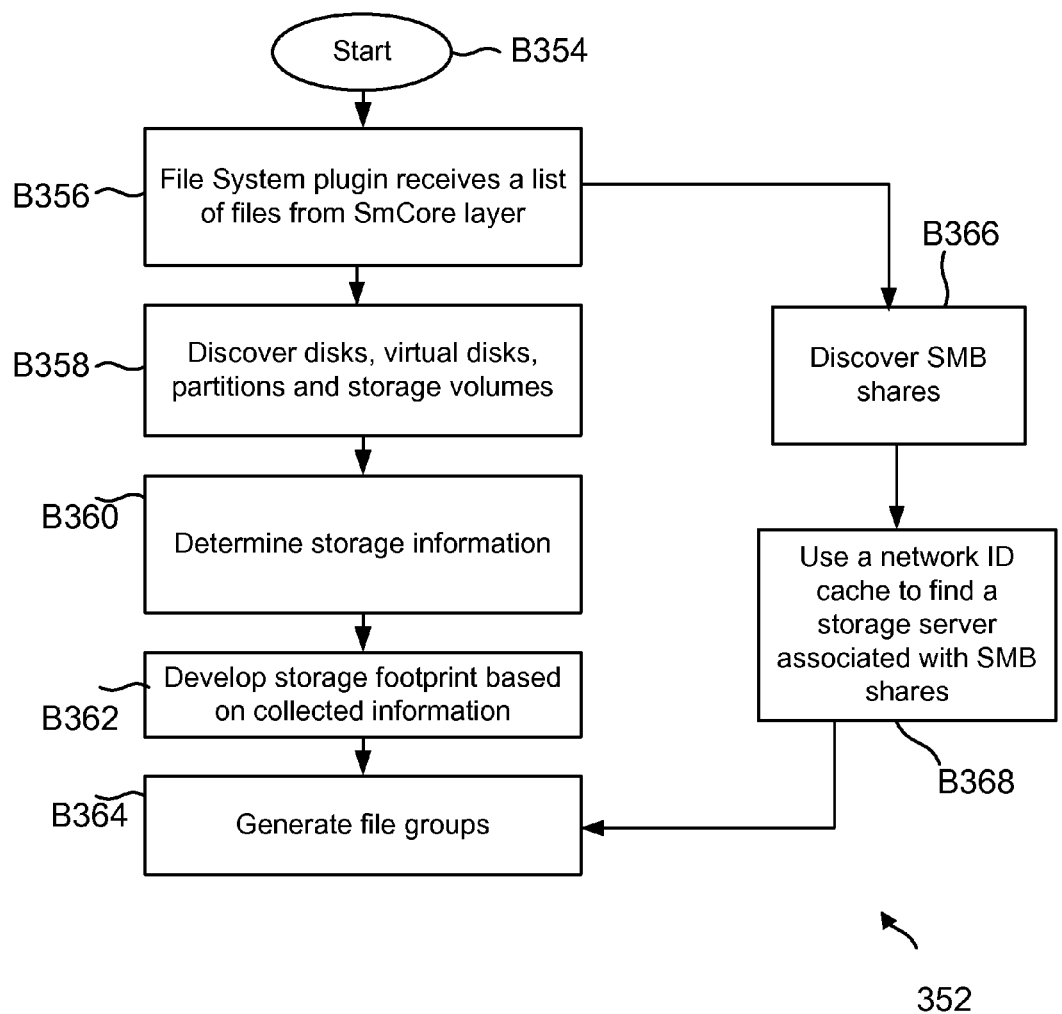
FIG. 3C shows an example of the discovery process using a file system plugin, according to one aspect of the present disclosure.

FIG. 3C shows a process 352 executed by the file system plugin 195A, according to one aspect of the present invention. The process of FIG. 3C is used to generate a storage layout (footprint) that defines a relationship between a data container (provided by the SMcore layer 130) with a file system, physical/virtual storage, and a hypervisor (if applicable). In one aspect, all disks, partitions and host volumes are discovered by the file system plugin 195A by sending a SCSI inquiry request to the storage system 108. For a clustered environment, disk, partition and volume information from all the cluster nodes is obtained. As described below in detail, the file system plugin 195A aggregates the storage information from the cluster nodes and also determines which disks are dedicated/shared.

For a NAS environment, the file system plugin 195A discovers SMB shares for associated storage system nodes (or controllers). This is performed by using a network identifier (ID) cache identifier, as described below in detail.

The process begins in block B354. In block B356, the file system plugin 195A receives a list of files from the SMcore 130 (as shown in B342, FIG. 3B). The file system plugin 195A then executes process blocks B358-B362 to develop a storage footprint for storage associated with the list of files. Process blocks B366-B368 are executed for generating a storage footprint for SMB shares associated with the list of files. SMB means Server Message Block, a file system protocol that provides a framework for applications to read and write data via the Internet. A SMB share is a logical storage representation that can be used to store data at a physical device.

Referring back to FIG. 3C, in block B358, the file system plugin 195A discovers the disks, virtual disks (when applicable), partitions and storage volumes that are associated with the list of files. The file system plugin 195A obtains a data path with the list of file names. This information is then provided to the cluster nodes when the host system is using a clustered storage system. The file system plugin 195A collects the information from the storage system 120.

A storage footprint is then developed in block B362. The storage footprint establishes a hierarchy that associates the list of files with various storage elements involved in storing the data for the file. For example, the hierarchy begins with a file (or a data container) from among the list of files, the file system (or a SMB share) associated with the file, a storage disk that stores the file, a LUN in a storage area network environment, and a hypervisor (when virtual machine environment is used) that presents a virtual disk for storing data for the file. This allows SMS 132 to efficiently handle storage services, as described below in detail.

In block B366, the plugin discovers the SMB shares associated with the files. SMcore 130 provides a data path to the file system plugin 195A. The data path includes a file name. This SMS share and the file server that is exposed to the host system may be collected from the storage system 120 using a ZAPI service call. In block B368, a network ID cache is used to determine the storage server (or node) that is associated with the SMB shares and the exposed file server. The network ID cache and the associated process is described below with respect to FIGS. 4 and 5A-5B. Thereafter, the process moves to block B362 that has been described above.

In block B364, file groups are generated to optimize storage services. For example, when certain files are a part of a same file system, then they may be grouped in a unique group. Files that may be stored by the same cluster node may also be grouped together. In one aspect, the file group is flexible and is based on a user's preference and operating environment. The file group creation results in efficient backup and restore operations.

Figure 4A:
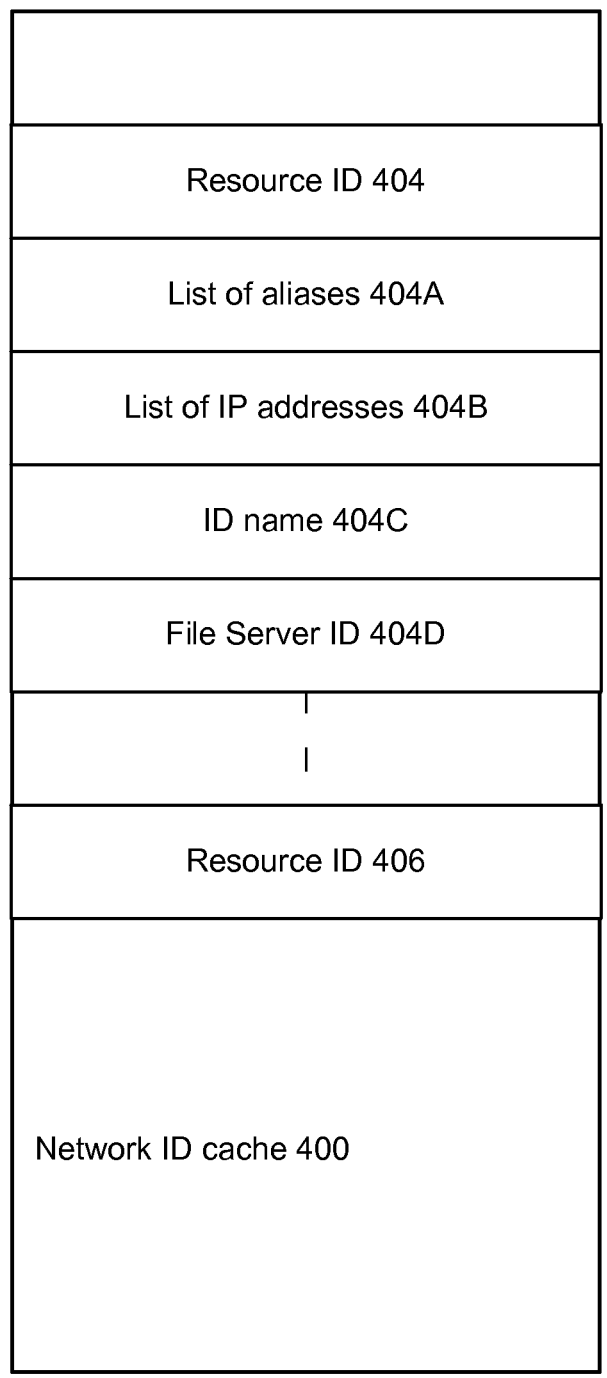
FIG. 4A shows an example of a network identifier (ID) cache, according to one aspect of the present disclosure.

FIG. 4A shows an example of a network ID cache 400 that is maintained by the file system plugin 195A at a host system memory. The network ID cache 400 may be used to store resource identifier (ID) information, shown as 404 and 406. Resource ID 404 includes a list of aliases 404A (i.e. the various names that may be used to identify the same storage server) that are maintained by DNS 107 (FIG. 1A). The resource ID 404 further includes a list of IP addresses (also referred to as a logical interface or "LIF") 404B that are used for accessing the storage server. As an example, one set of LIFs may be exposed for CIFS clients, another set for NFS clients and yet another set for SAN based clients. For each group of LIFs, an alias may be used to identify the same physical server. The DNS 107 maintains that information at a storage device.

The resource ID 404 further includes a name of the identifier itself 404C and a unique file server identifier 404D. Thus network ID cache 400 enables the file system plugin 195A to obtain network access information for storage access, as described below in detail.

Figure 4B:
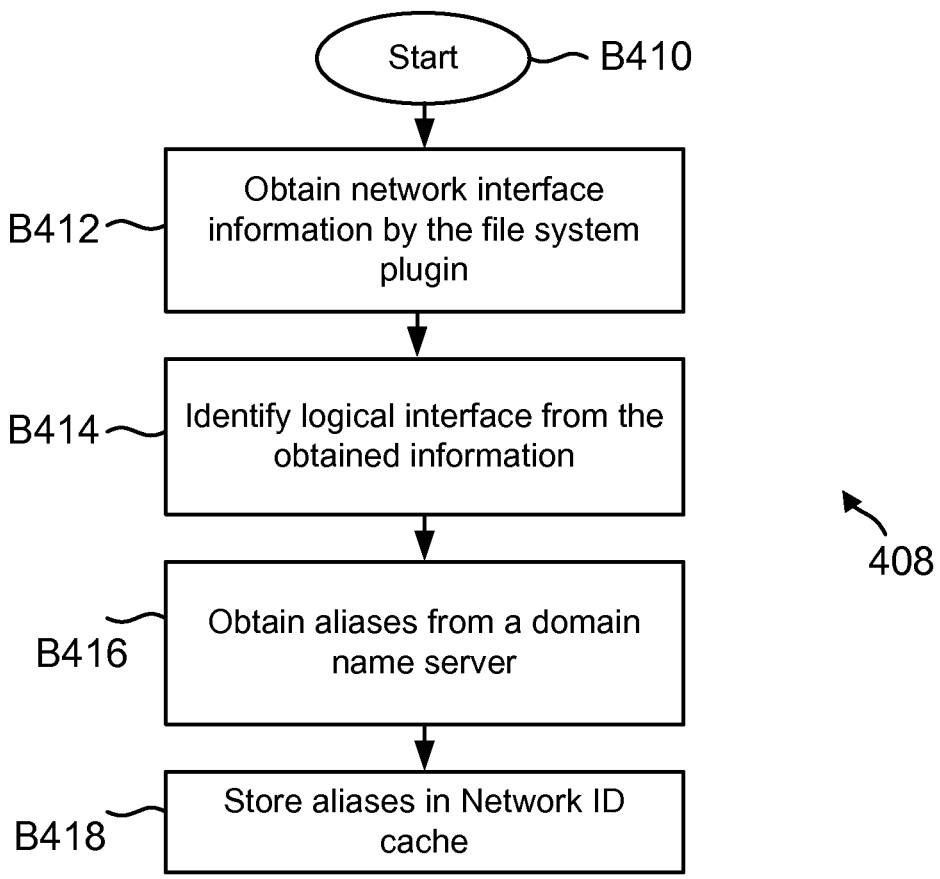
FIG. 4B shows a process flow for populating network cache ID entries, according to one aspect of the present disclosure.

FIG. 4B shows a process 408 for initializing the network cache, according to one aspect. The process begins in block B410, when the file system plugin 195A is initialized and communicating the storage system 120 as well as DNS 107.

Figure 9A:
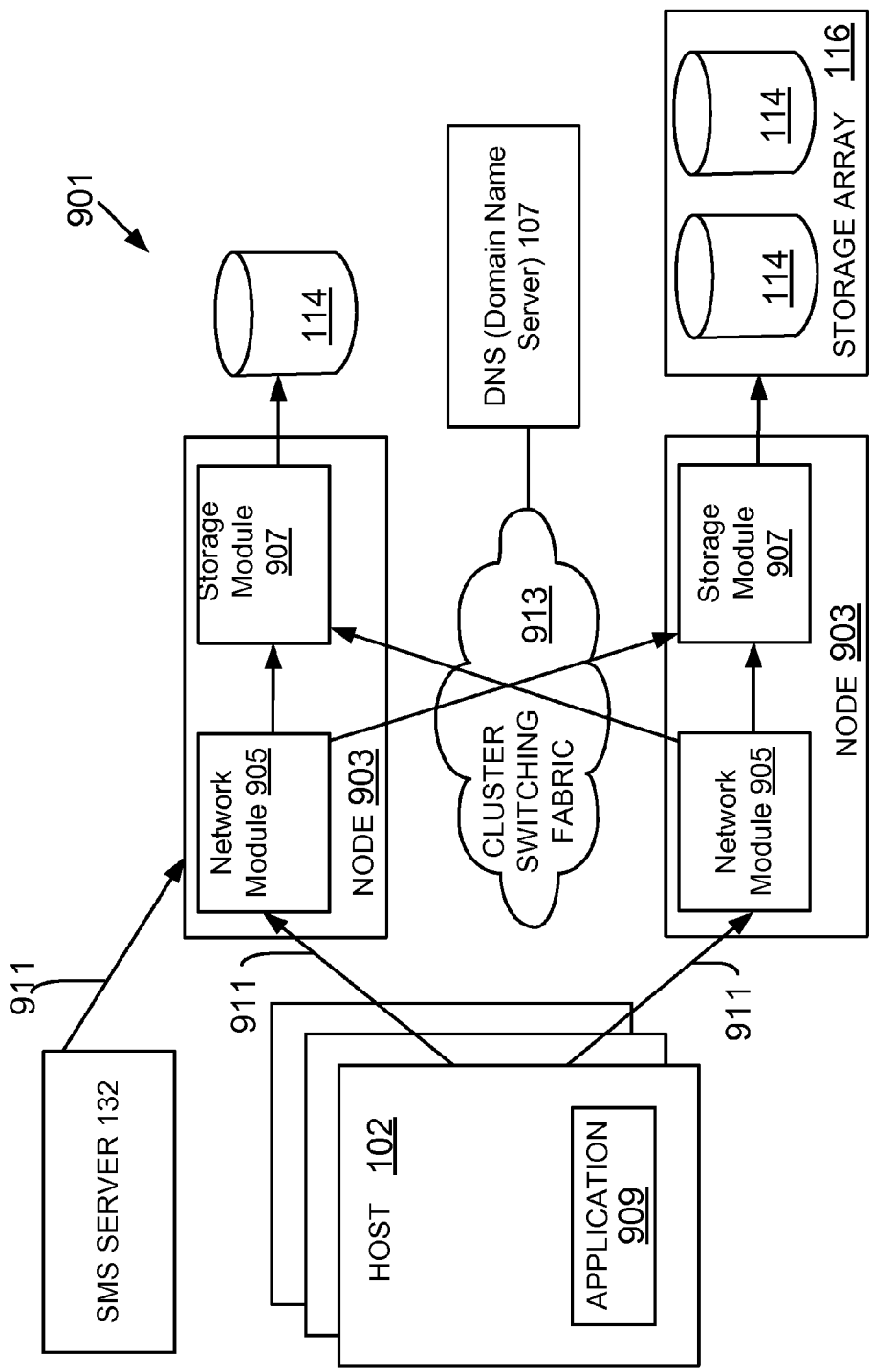
FIG. 9A shows an example of a clustered storage system environment, used according to one aspect of the present disclosure.

In block B412, the file system plugin 195A obtains network interface information from the storage system 120 (for example, an Network module in a cluster environment (FIG. 9A). In one aspect, the network interface information includes all LIFs that are exposed to a virtual server (vServer). A vServer is a virtual representation of a storage controller that is presented to host systems for storing and managing data.

In block B414, the LIFs that are exposed for a CIFS/NFS connection are obtained. In block B416, the file system plugin 195A obtains any aliases that are associated with the LIFs from the DNS 107. In block B418, the aliases are stored as part of the resource ID in the Network ID cache 400 described above in detail.

Figure 4C:
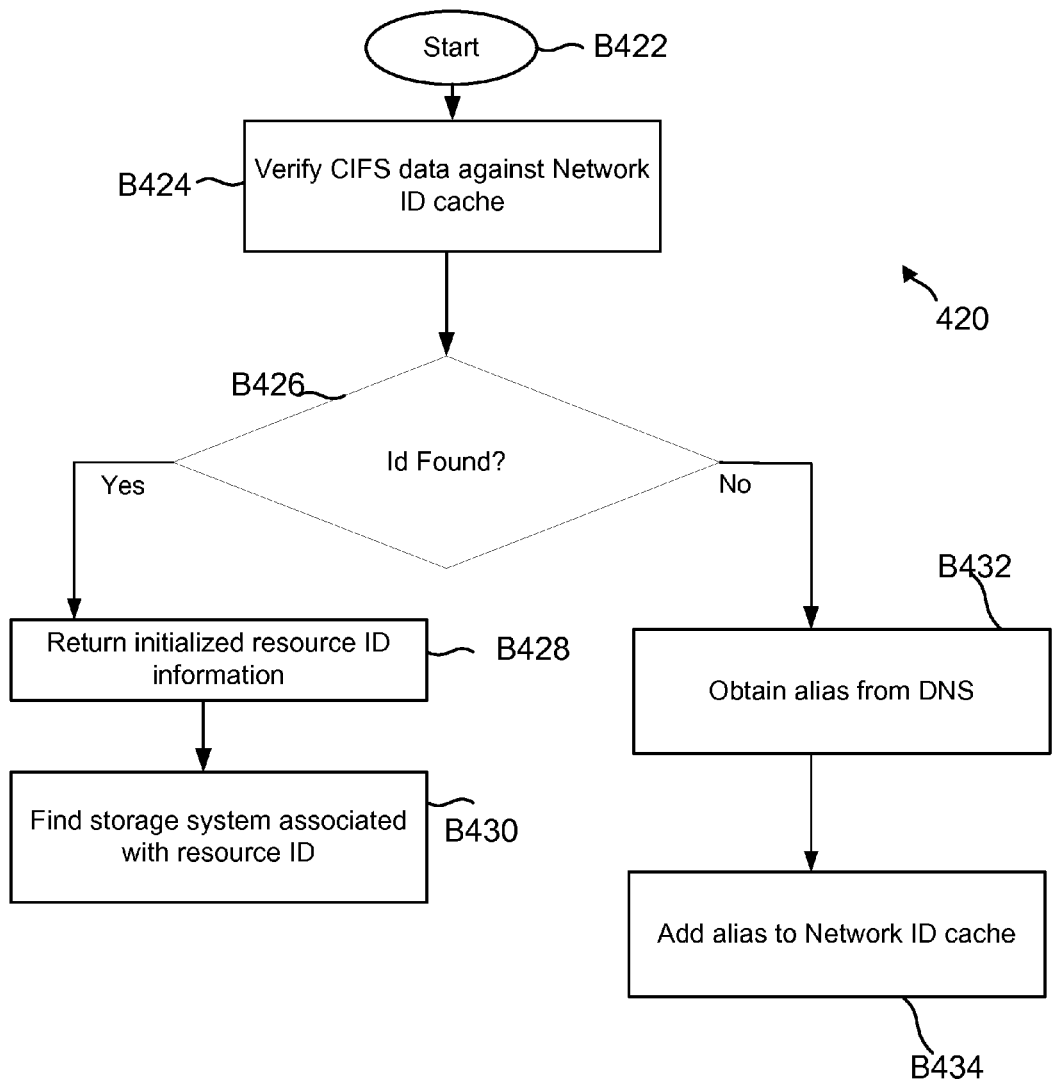
FIG. 4C shows a process flow for using the network cache ID, according to one aspect of the present disclosure.

FIG. 4C shows a process 420 for discovery of SMB shares, according to one aspect of the present disclosure. The process begins in block B422, when SMS 132, hosts 102 and the file system plugin 195A are operational and initialized and process 500 has been executed. In block B424, the file system plugin 195A verifies if the file server name included in a CIFS data path is stored at the network cache ID as part of a resource ID. In block B426, the file system plugin 195A determines if there is a matching entry. If yes, then in block B428, the initialized resource ID information is returned. In block B430, the storage system node associated with the resource ID is determined. This information is then provided to the SMcore 130.

If there is no match in block B426, then the file system plugin 195A obtains any aliases for the file server from the DNS 107 in block B432. The aliases provide alternate identifiers for the file server which are added to the network ID cache in block B434.

In one aspect, the network ID cache and the associated processes described above, enable the file system plugin to efficiently discover the storage footprint for a list of data containers from the SMcore 130.

Backup Process Flows:

In one aspect, SMS 132 and SMcore layers 130A-130N use the appropriate plugin(s) to backup information stored for any application type at storage system 120. The backups are initiated by a backup schedule for one or more stored objects or on-demand based on user input through a GUI interface. The SMS server 132 creates a backup job in a standard format so that backup job for every application can be tracked and reported to the user. Once the job is created, the SMS server 132 notifies the SMcore 130 of the host system that executes the application for the stored objects.

The SMcore 130 at the host system then drives the backup process flow by first discovering the appropriate resources used by the application and the storage system 120. Details regarding the process flows are provided below.

Figure 5A:
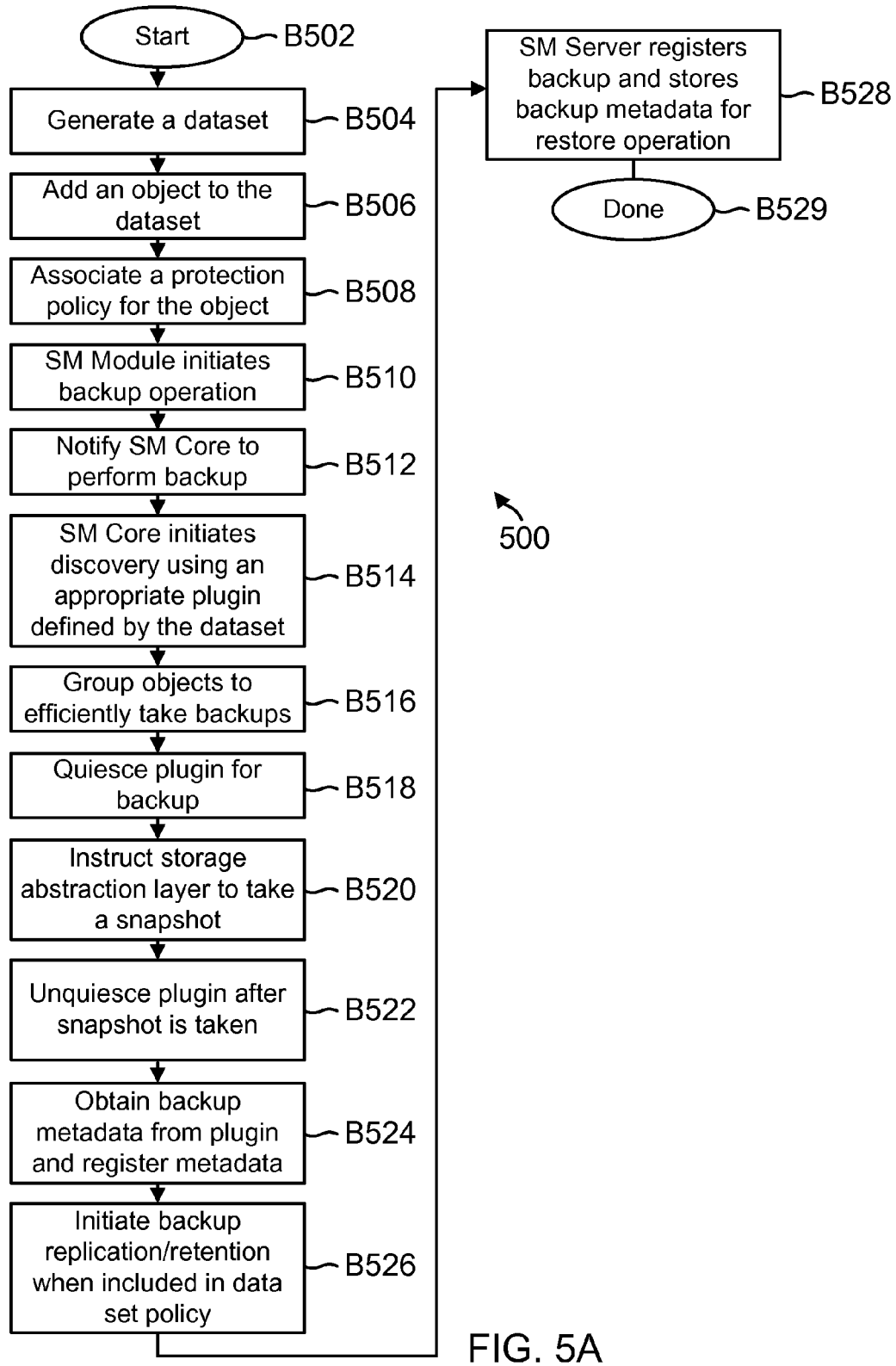
FIG. 5A shows a process flow for creating a dataset and then executing a backup workflow, according to one aspect of the present disclosure.

FIG. 5A shows a process 500 for creating a dataset and then executing a storage service operation, for example, a backup operation using SMS 132, according to one aspect. The process begins in block B504, when a dataset is generated based on user input. An example of a dataset is shown in FIG. 2E and described above in detail.

In block B506, an application object is added to the dataset. The application object may be a database, a virtual machine, a data container or any other object type. A protection policy is applied to the dataset in block B508. The protection policy includes a retention schedule (i.e. for how long a snapshot or backup) copy of the application object is to be retained. A backup schedule that defines when and how often the object is to be backed. The protection policy also defines a backup type, for example, a full backup of a storage volume or a log backup. It is noteworthy the dataset is managed in the same format regardless of the object type, the application type and/or backup type.

In block B510, the SM module 134 at SMS 132 initiates a backup operation. The backup operation is based on the policy for one or more stored objects that are defined in the dataset. The job manager 182 generates a job object to track the backup operation. Thereafter, in block B512, the SMcore layer 130 associated with the host system for the stored object is requested to perform the backup operation. Because the SMS 132 and SMcore layer 130 use a standard request and response format to communicate as described above with respect to FIG. 2A, SMS 132 is able to initiate and manage backup operations for different host systems and applications.

In response to the backup request, in block B514, the SMcore layer 130 initiates a discovery operation for a backup operation. In one aspect, the discovery request is routed to an appropriate plugin depending on the object and the dataset. For example, if the object is a SQL database, then the discovery request is forwarded to the SM plugin 187A executed by the appropriate host identified by the dataset. For a UNIX host, the Oracle plugin 189A is used to discover the list of files for the database.

The storage footprint for the database is also obtained. The storage footprint may be obtained using file system plugin 195A for the Windows case. For a virtual environment, the Hypervisor plugin and/or the VSC plugin maybe used to obtain the storage footprint. Once the storage footprint is obtained, in block B516, the process groups the storage objects into multiple sets to take a backup. This reduces the number snapshots that the system has to take.

In block B518, the plugin for the backup operation is quiesced i.e. placed in a state where other operations are delayed until the backup operation is completed. SAL 151A is instructed to take a snapshot in block B520. Once the snapshot is taken by the storage system 120 using storage services module 122 (the details of which are not provided here), the SMcore 130 instructs the plugin to unquiesce in block B522. Thereafter, the SMcore 130 obtains the backup metadata in block B524. An example of backup metadata is shown in FIG. 5D, described below in detail. The backup metadata is stored by the SMS 132 for restore operations described below in detail. In block B526, the retention and replication policy for the backup is implemented. This will depend on the policy itself. In block B528, the SMS 132 registers the backup and stores the metadata for restore operations. Thereafter, the process ends in block B529.

Figure 5B:
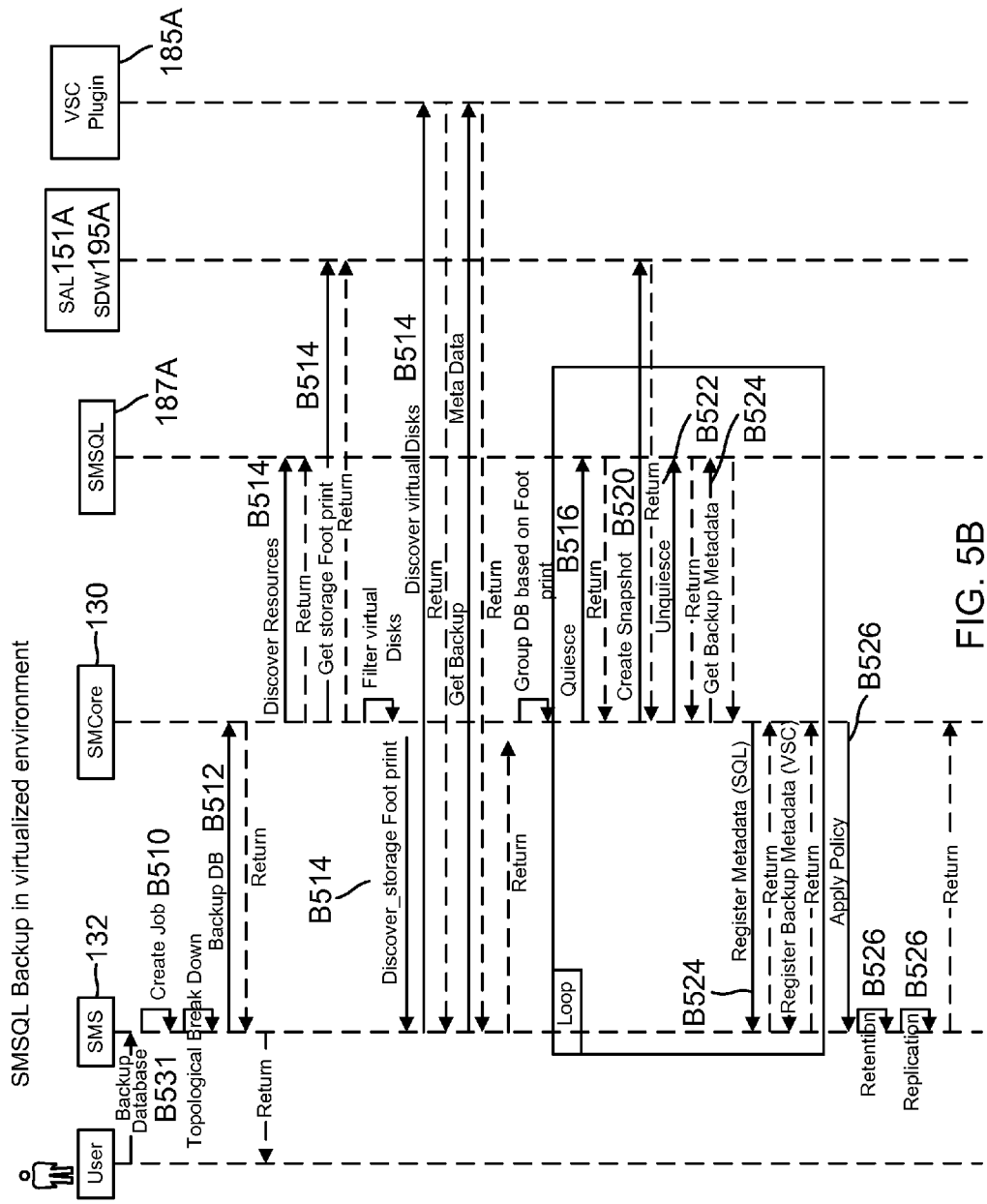
FIG. 5B shows a process flow for taking backups in the system of FIG. 1A, according to one aspect of the present disclosure.
Figure 5C:
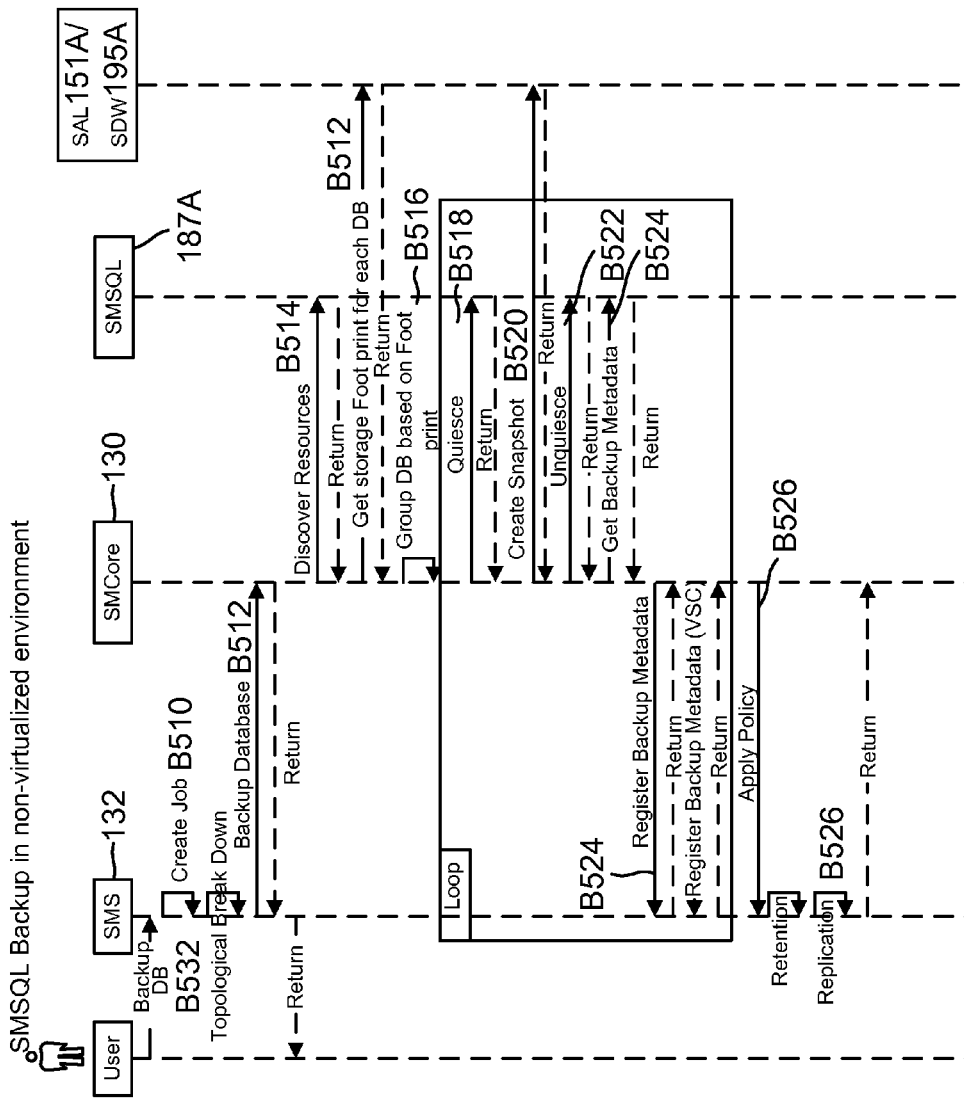
FIG. 5C shows portions of the process of FIG. 5B in a non-virtualized environment, according to one aspect of the present disclosure.
Figure 5D:
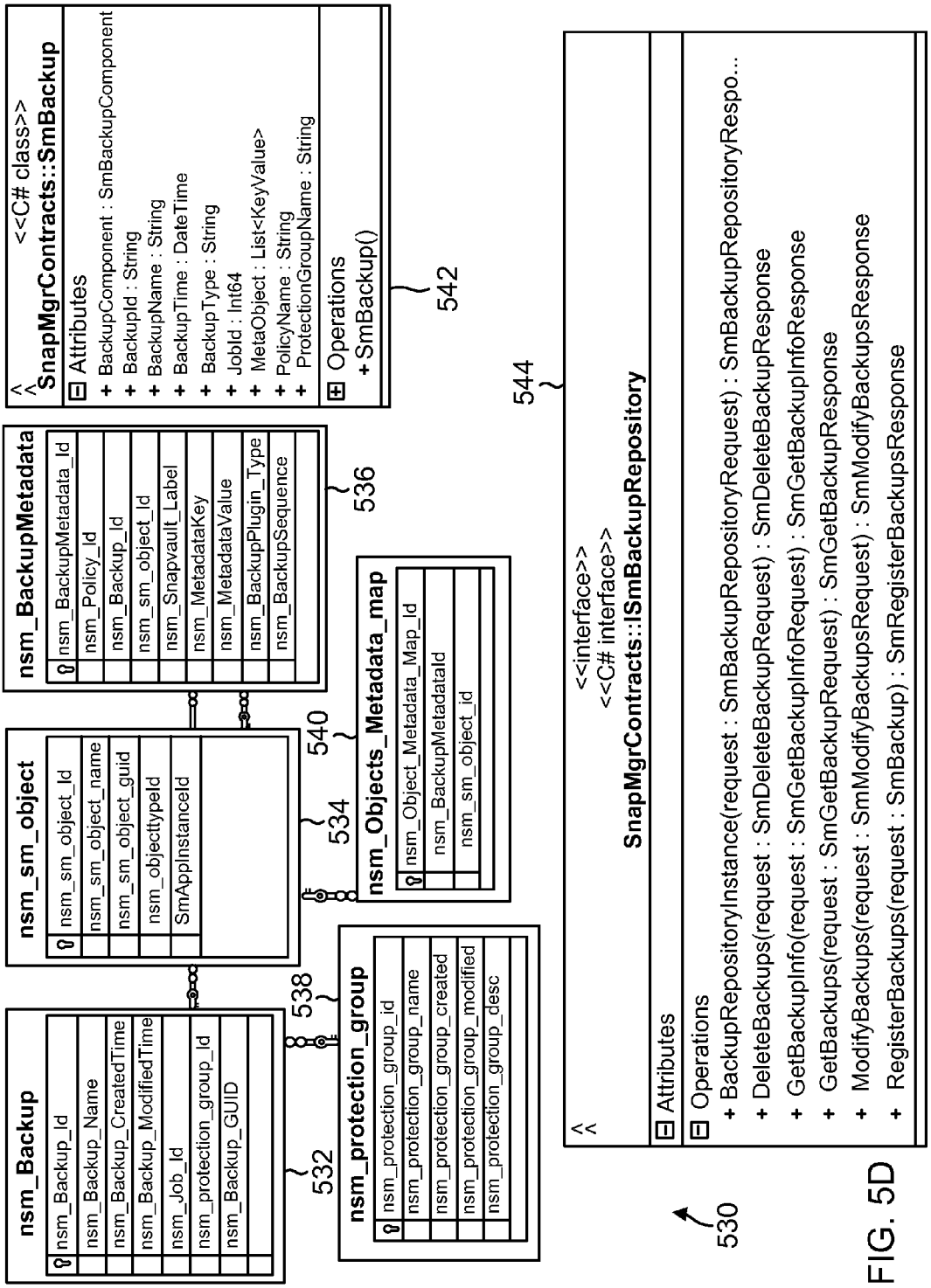
FIG. 5D shows a format for storing backup metadata by the SMS, according to one aspect of the present disclosure.

FIG. 5B shows an example of executing the process 500 from block B510 onwards in in a virtualized environment where VMs are used or where applications within a VM environment is used. A backup request is received by SMS 132 (shown as B531). The backup job object is created by SMS 132 in block B510. The backup request to SMcore 130 is sent in block B512. The discovery takes place in block B514. The databases are grouped in block B516. The rest of the process blocks are self-explanatory, including blocks B528A/B528B for applying retention and replication policies FIG. 5C shows portions of process 500 (from block B510 onwards in a non-virtualized environment, after a request for a backup is received in block B531. The process blocks of FIG. 5C are similar to FIG. 5B, except the storage footprint also includes virtual disks and discovery of virtual disks.

FIG. 5D shows a format 530 for managing backup metadata for a plurality of applications, according to one aspect. In one aspect, SM module 134 maintains a same data structure format representing all application plugins. A common backup metadata interface is maintained for different plugins, as described below. If a plugin wants to extend the metadata, then SMS 132 allows addition of application specific tables and links. The common backup metadata interface is used to collect and store the metadata. Although different applications may have different backup metadata and metadata formats, the SM module 134 stores the metadata in a generic format, regardless of application type. This makes the overall process for managing the backups and the associated metadata efficient, as described below in detail.

FIG. 5D shows a main backup object 532 that is used to store a backup identifier (nsm_backup_id) and a backup name. The backup object 532 may also be used to store the time the backup was created and when it was last modified. A job identifier (job_id) identifies the job that was used to create the backup. A protection identifier (protect_group_id) defines the dataset to which the backup belongs. The protection group identifier is associated with a protection group object 236 that includes details regarding the protection group i.e. the protection group name, when it was created, modified and a description.

Object 532 is also associated with object 534 that is labelled as nsm_sm_object. Object 534 identifies the object that is being backed up. The object is uniquely identified by a name and an identifier, including a global unified identifier (GUID). Object 534 also indicates the object type, for example, a virtual machine, a database and others and includes an identifier for a snapshot instance. Object 534 is associated with object 540 that identifies what is being backed up. Object 540 also identifies a metadata map and a backup metadata.

Object 532 is also associated with a protection group object 538. The protection group object is identified by a protection group identifier, group name, description and the time the group was created and/or modified.

The backup metadata is shown in object 536 that provides the database schema for handling metadata. Object 536 represents the common aspects of backup metadata across multiple applications. Applications/application plugins may customize the metadata which allows SMcore modules to interact in a seamless manner, regardless of application type.

Object 536 provides a mechanism to attach and lookup attributes of backups along with specific metadata elements. Object 536 identifies backup metadata with an identifier. The metadata also identifies a policy and the backup for a data container. The object that is backed up is identified as nsm_sm_object_id. An application specific key value pair may be stored in object 536 as metadata key and metadata value. The plugin associated with the backup is identified by the backup plugin type. The backup sequence identifies the number of the backup when more than one backup exist.

The generic backup representation of FIG. 5D uses key value pairs so that different application requirements can be met efficiently. Thus backup metadata for different plugins can be extended using this approach.

An example of object 534 is shown as SMbackup object 542. Object 542 is designed to abstract all the backup information including resources that are backed up. Object 542 identifies the components that are backed up ("Backup Component"). The identifier for the backup and a backup name. The date of the backup and the backup type. The job identifier is shown as INt64. The metaobject is shown as the "keyvalue" that is customized for different applications. The policy name and the protection group names are also shown in object 542. If a plugin needs additional data or objects, then that can be added under "Operations" showing "Smbackup". A new class may be used to represent plugin specific detailed object information backed by using a plugin specific database schema.

FIG. 5D also shows an example of an interface 246 labelled as "ISMBackupRepository" that is used to obtain backup metadata. The interface may also be used to delete backups, get backups and register backups.

Figure 6A:
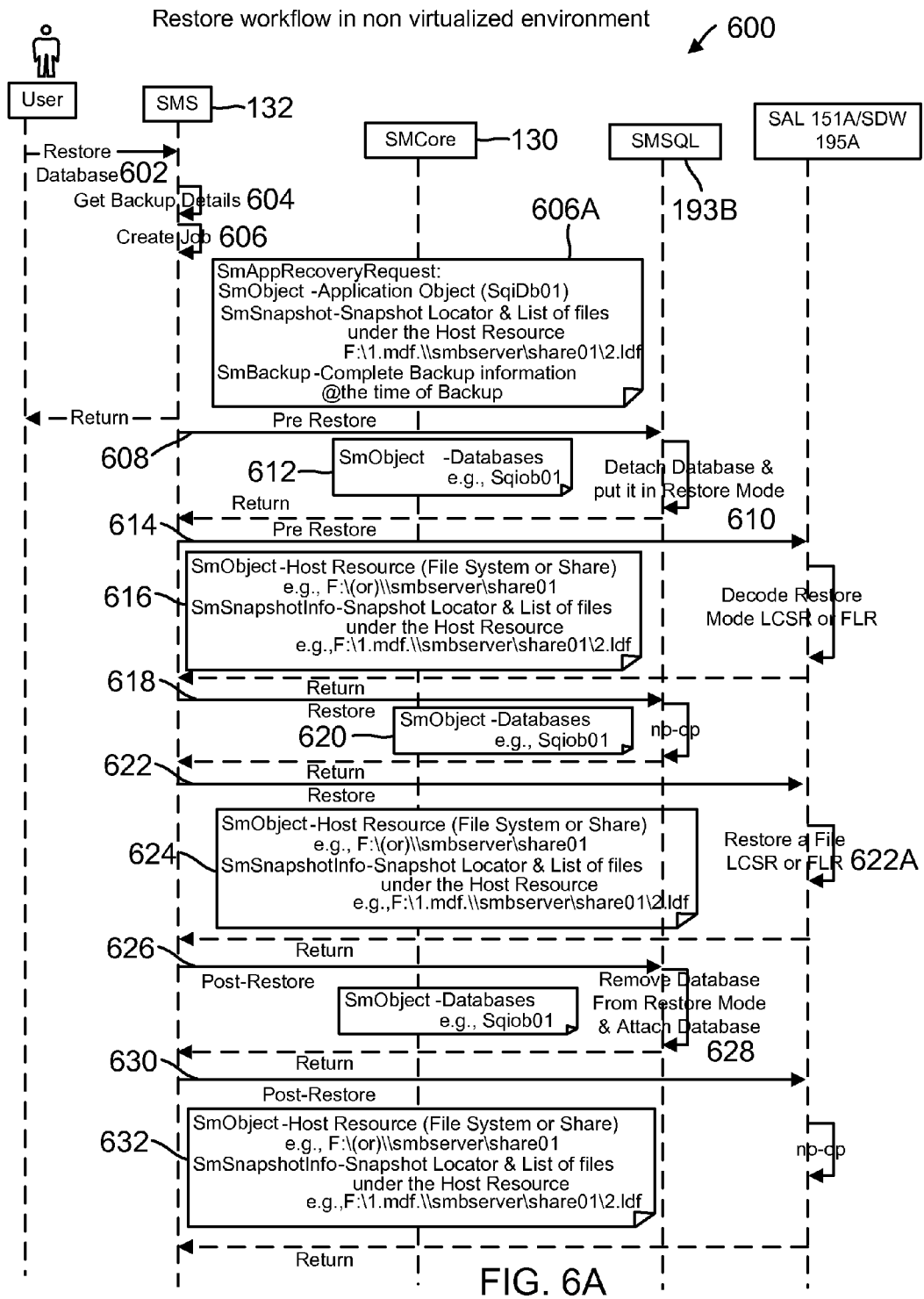
FIG. 6A shows a restore process flow in a non-virtualized environment by the SMS, according to one aspect of the present disclosure.

Restore Workflows:

FIG. 6A shows an example of a process 600 for restoring a stored object that has been backed up. The stored object may be a SQL database in a Windows environment. Process 600 shows interactions between SMS 132, SMcore 130, SMSQL plugin 193B and SAL 151A/file system plugin 195A. The process begins when a request to restore a stored and backed up object (for example, a SQL database) is received in block 602. It is noteworthy that the same process may be used with a different stored object stored for a different application. The restore request may be received via a GUI or a CLI.

In response to the request, SMS 132 (i.e. the recovery module 152 of SM module 134) obtains the backup details from database 176 in process block 604. As described above, the backup metadata is stored in a same format regardless of object or application type and may be searched for using a key-value pair, for example, a backup ID and a host ID or other values.

The job manager 182 then creates a job and an application recovery request in process block 606. An example of the recovery request object is shown as 606A. The recovery request object identifies the Smobject as a SQL database and also includes information on the snapshot and the location information for the snapshot files. The recovery object also identifies the backup type.

In process block 608, a pre-restore request with object 612 is issued to SMcore 130 that issues the pre-restore request to plugin 193B that interfaces with the SQL application. Object 612 includes a list of database files that are being restored. The plugin 193B detaches the database that is being restored into a restore mode in process block 610.

In process block 614, the pre-restore request with object 616 is also sent to SAL 151A/file system plugin 195A that interfaces with the storage system interface 195 and the storage system 120. Object 616 provides the list of files that are to be restored. SAL 151A/file system plugin 195A decides if the request is for a single file or a complete LUN restore. Details of the pre-restore operations of the file system plugin are provided below.

A restore request is then sent to SMSQL plugin 193B with object 620 (similar to 612). A restore request is also sent to SAL 151A/file system plugin 195A via SMcore 130 with object 624 that is similar to 616. The storage system 120 restores the files and notifies SAL 151A/file system plugin 195A.

A post-restore process is triggered in process block 626. The plug-in 193B is requested by SMcore 130. In block 628, the plugin 193B removes the database from the restore mode and attaches the database so that it can be accessed.

In process block 630, a post-restore request is sent to SAL 151A/file system plugin 195A with object 632, similar to object 624. Thereafter, the process ends.

Figure 6B:
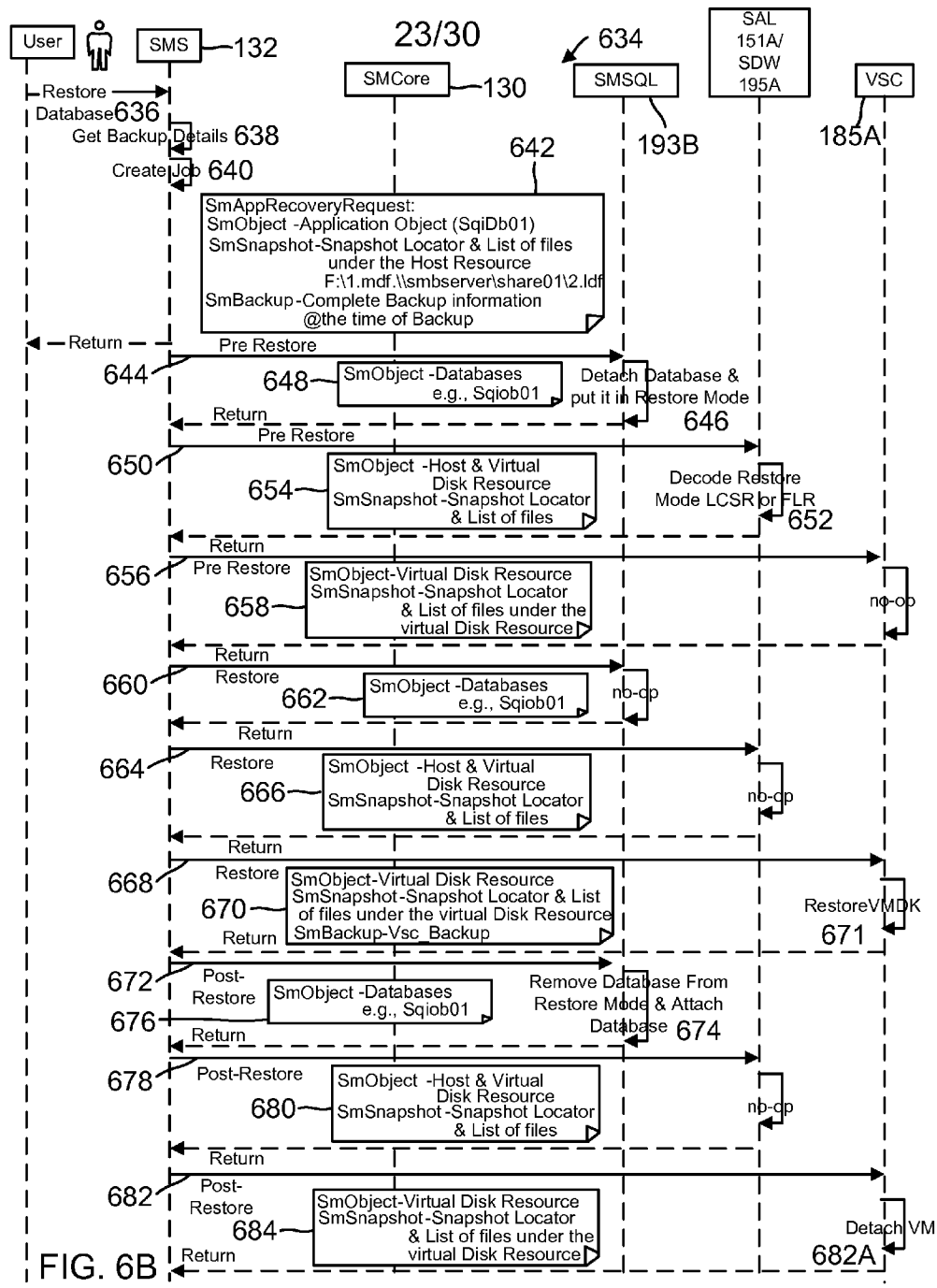
FIG. 6B shows a restore process flow in a virtualized environment by the SMS, according to one aspect of the present disclosure.

FIG. 6B shows a process 634 for restoring a complete VM based storage, according to one aspect of the present disclosure. Various FIG. 6B process blocks are similar to the process blocks of FIG. 6A, except in FIG. 6B, the virtual plugin 185A is also involved to obtain information regarding virtual disks and the association of the virtual disks to the actual storage managed by the storage system 120. The example of FIG. 6B is also for restoring a database that is being managed in a VM environment i.e. a SQL database in a VM environment (i.e. a virtualized SQL).

In process block 636, a restore request is received. The request may be received via a GUI and identifies a backup that needs to be recovered. The request may also identify the virtual machine where the SQL application may be running. The request is received by SMS 132 and then passed to the recovery module 152. The recovery module 152 uses backup identifier information from the request and obtains backup details from the stored backup metadata at database 176. An example of backup metadata is shown in FIG. 5D and described above. The job manager 182 then creates a restore job in block 640. An app recovery request object is created by SM module 134 and is shown as 642. Details of 642 are similar to 606A described above with respect to FIG. 6A.

In process block 644, a pre-restore request is sent to the SMcore layer 130 at a host system that manages the database that is being restored. The SMcore layer 130 presents the request to the SMSQL plugin 193B. In block 646, the plugin detaches the database mentioned in the recovery object 624 and 644 and places the database in a restore mode.

The pre-restore request is also sent to SAL 151A/file system plugin 195A in process block 650 with object 654. Object 654 provides the list of files that are to be restored and a snapshot locator i.e. where the snapshot is located from the storage system 120's perspective. The SAL 151A/file system plugin 195A determines the type of restore operation, similar to process block 616, described above with respect to FIG. 6A.

The pre-restore request is also provided to the VSC plugin 185A in block 656. The VSC plugin 185A is also provided with a list of virtual disks in object 658 that are used to store the database files.

In block 660, a restore request is first sent to the SQL plugin 193B with object 662 i.e. list of the database files. The restore request with list of storage system files (i.e. Snapshot locator and a list of application files in object 666) is also sent to SAL 151A/file system plugin 195A in block 664.

In block 668, the restore request is sent to the VSC plugin 185A with object 670. Object 670 includes virtual disks and a VSC backup object that identifies the backup from the VSC's perspective. The VSC plugin 185A mounts the virtual disks in block 671. Thereafter, a post-restore request is sent via SMcore 130 to SQL plugin 193B in block 672 with a list of databases (see object 676). In block 674, the SQL plugin 193B removes the database from the restore mode and makes the database available for use.

The post-restore request is also sent to the SAL 151A/file system plugin 195A in block 678 with object 680. In block 682, the post-restore request is also sent to the VSC plugin 185A with object 684, which is similar to 607. The VSC plugin 185A then detaches from the VM in block 682A and the process ends.

Figure 6C:
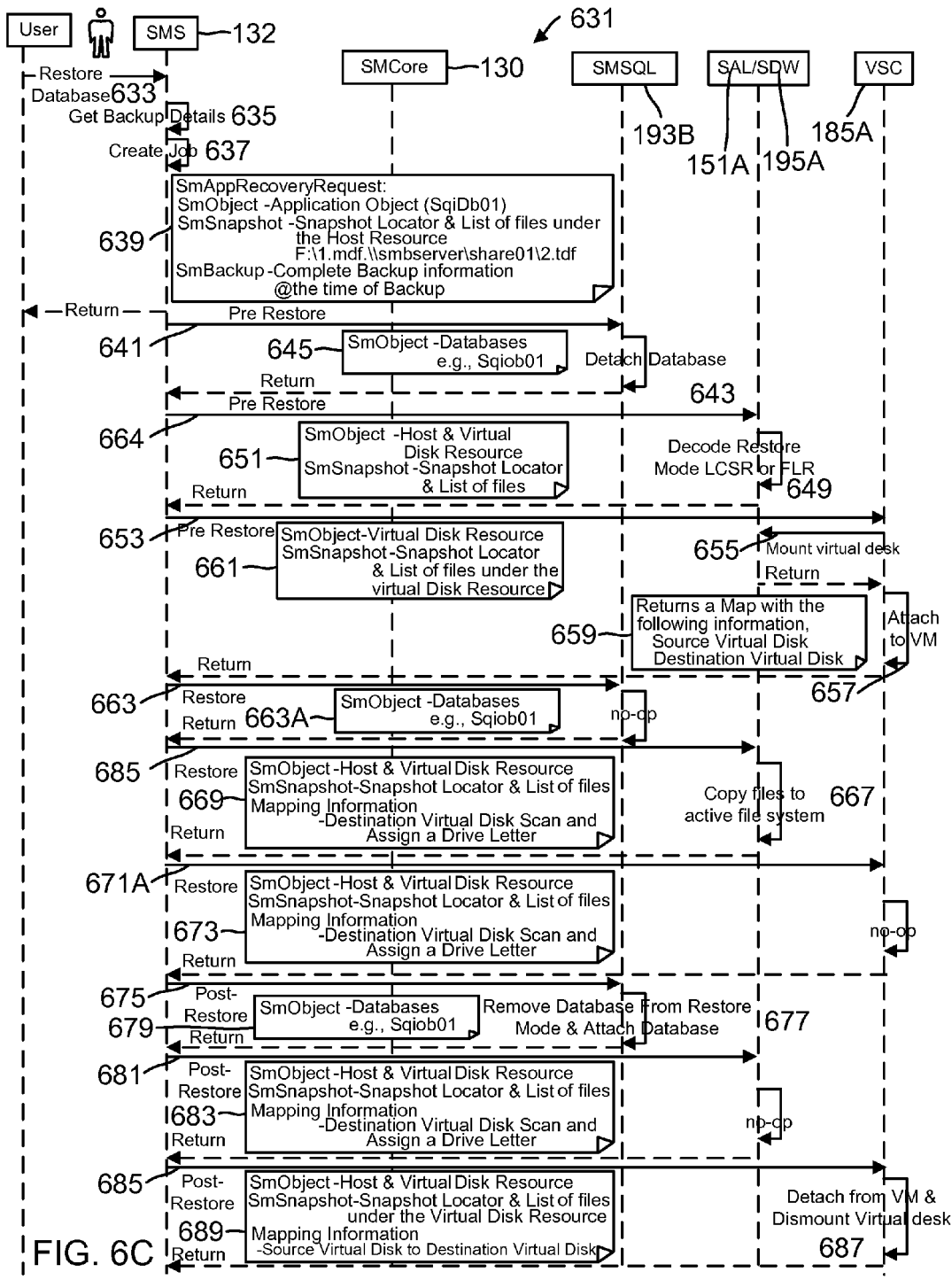
FIG. 6C shows a restore process flow in a virtualized environment by the SMS for a partial virtual disk, according to one aspect of the present disclosure.

FIG. 6C shows a process 631, similar to process 634, except the restore process is for a partial virtual disk (or VMDK), according to one aspect. The similar process blocks have been described above and for brevity sake the description is not being repeated. For example, block 633 is similar to 636, block 635 is similar to 638, block 637 is similar to 640 and object 639 is similar to 642.

Block 641 is similar to 644, object 645 is similar to 648 and block 643 is similar to 646. Block 647 is similar to 650, object 651 is similar to 654 and block 649 is similar to 652.

Block 653 is similar to block 656 ad object 661 is similar to object 658. In block 655, the VSC plugin 185A mounts the virtual disk that are affected by the restore operation and attaches itself to the VM. Object 659 is returned to SMS 132 with information regarding the source virtual disk and the destination virtual disk.

Block 663 is similar to 660 and object 663A is similar to object 662.

Block 665 is similar to block 664. Object 669 is similar to object 666 but also includes destination virtual disk and a drive letter. In block 667, the files that need to be restored are copied to the active file system.

In block 671A, a restore request is sent to VSC plugin 185A with object 673. Object 673 includes all the information of object 670 and also includes destination virtual disk and the assigned drive letter for the restored database.

Block 675 is similar to 672 and object 679 is similar to 676. Block 677 is similar to 674, while block 681 is similar to block 678. Object 683 is similar to object 673. Block 685 is similar to block 682, while block 687 is similar to block 682A. Object 689 is similar to object 684 and also includes a mapping of source virtual disk to the destination virtual disk where the database is restored.

Figure 7:
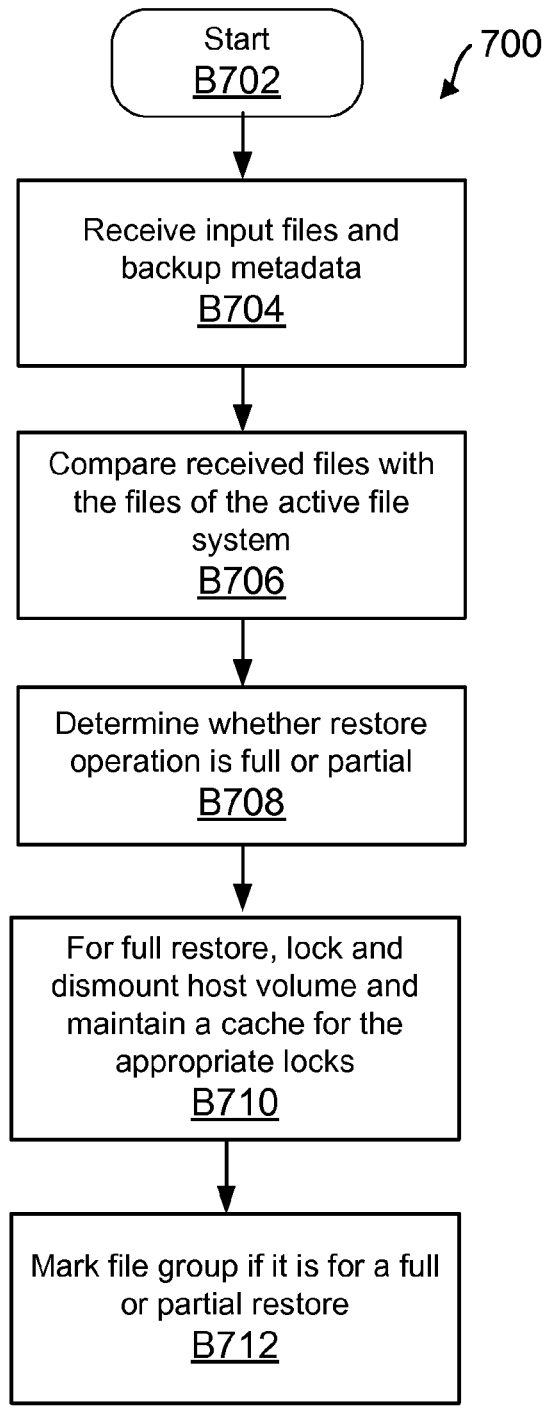
FIG. 7 shows a process flow for the file system plugin during a pre-restore phase, according to one aspect of the present disclosure.

FIG. 7 shows an example of the pre-restore process 700 executed by the file system plugin 195A, according to one aspect of the present disclosure. The process begins in block B702. In block B704, the list of files and the associated metadata for the backup are received (for example, object 614, FIG. 6A). The file system plugin 195A, in block B706, compares the list of files obtained from the SMcore 130 with the files that are in the active file system at that instance. This may be executed by interfacing with the storage system 120 that maintains the list of files in an active file system. In block B708, the file system plugin 195A determines if an entire storage volume is being restored or if a partial volume i.e. certain files are being restored. When the list of files match all the files in the active file system, then the restore is a full restore, otherwise, it is a partial restore. For a full restore, in block B710, the file system plugin 195A locks and dismounts the underlying host side volume to avoid any writes during the restore process. Thereafter, in block B712, the file system plugin 195A marks each file group within the restore request, if it is for a partial or a full restore.

Figure 8:
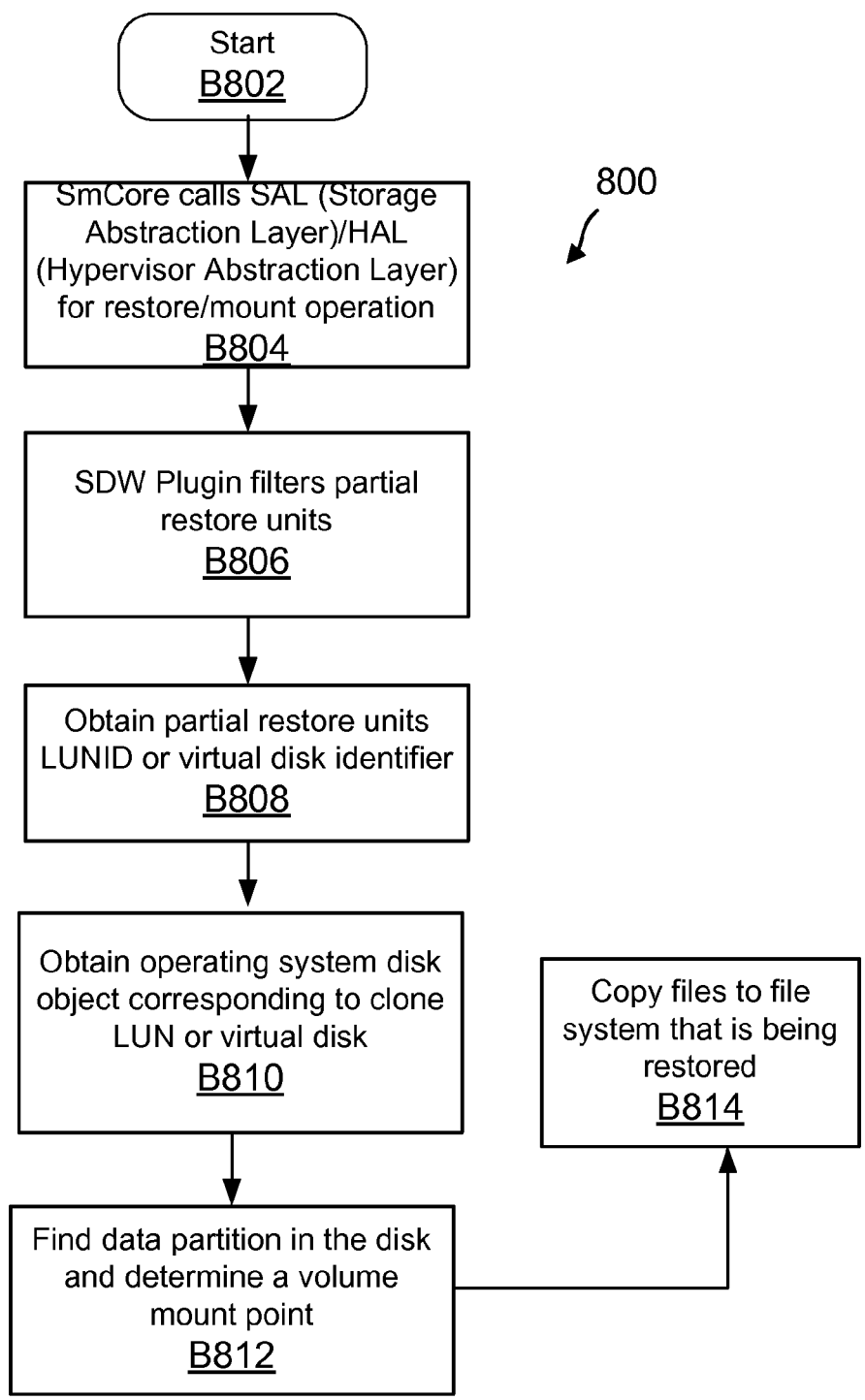
FIG. 8 shows a restore process flow for the file system plugin, according to one aspect of the present disclosure.

FIG. 8 shows a process 800 for restoring a backup, according to one aspect of the present disclosure. The process begins in block B802. The SMcore 130 calls on SAL 151A, HAL 153 for a restore/mount operation in block B804.

In block B806, the file system plugin 195A filters out any partial restorable files (or units). The file system plugin 195A is able to do that because during pre-restore, as described above, it had determined the scope of the restore request. For partial restore units, the file system plugin 195A obtains a LUN identifier or a clone's virtual disk identifier. The LUN identifier identifies the LUN that is being restored. The clone virtual disk identifier identifies the clone that is used for the restore operation. This information may be obtained from SAL151A/HAL 153.

In block B810, the file system plugin 195A obtains the host operating system's disk object corresponding to the clone LUN or virtual disk. The host operating system maintains logical objects that are associated with logical storage objects that are maintained by the storage system. Based on that, in block B812, the file system plugin 195A obtains the data partition in the disk and clears any stale access paths. A volume mount point that is not in use is determined and assigned to the disk partition. Thereafter, in block B814, files from a cloned file system are copied to the file system that is being restored. Thereafter, the process ends.

Clustered Storage System:

FIG. 9A is a schematic block diagram of a clustered storage system 901 having a plurality of storage system nodes 903 configured to provide storage services related to organization of information at a plurality of storage devices 114 described above with respect to FIG. 1A. Nodes 903 interface with various host systems 102 and SMS 132 described above with respect to FIG. 1A. The various adaptive aspects described herein are not limited to a clustered or a non-clustered storage system.

Nodes 903 comprise various functional components that cooperate to provide distributed storage system architecture of cluster 901. Each node 903 is generally organized as a network module (may also be referred to as "N-Module")) 905 and a storage module may also be referred to as D-module) 907. Network module 905 includes functionality that enables node 903 to connect to hosts 102 over a network connection 911, while each storage module 907 connects to one or more storage devices, such as 114 or the storage array 116 having a plurality of storage devices 114. Illustratively, network 911 may be embodied as an Ethernet network, a Fibre Channel (FC) network or any other network type. Nodes 903 may be interconnected by a cluster switching fabric 913 which, in the illustrative embodiment, may be embodied as an Ethernet switch (for example, a Gigabit (or higher) Ethernet switch) or any other interconnect type.

In one aspect, network interface 911 presents a plurality of virtual interfaces (VIFs) (may also be referred to as LIFs (for example, IP addresses) provided between the respective Network modules and the host systems, allowing the storage devices associated with the nodes to be presented to the host systems as a single shared storage pool.

In one aspect, the clustered storage system 901 can be organized into any suitable number of Vservers, in which each Vserver represents a single storage system namespace with separate network access. Each Vserver has a user domain and a security domain that are separate from the user and security domains of other Vservers. Moreover, each Vserver is associated with one or more LIFs and can span one or more physical nodes, each of which can hold one or more LIFs and storage associated with one or more Vservers. Host systems can access the data on a Vserver from any node of the clustered system, but only through the LIFs associated with that Vserver.

In one aspect, the information regarding various LIFs, storage server/node names, file server names that are exposed to the host systems are maintained by the DNS 107. The file system plugin 195A, as described above with respect to FIGS. 4A-4C is able to verify and obtain server aliases from DNS 107.

It should be noted that while there is shown an equal number of network and storage modules in the illustrative cluster 901, there may be differing numbers of network and/or storage modules in accordance with various embodiments of the present disclosure. For example, there may be a plurality of Network modules and/or Storage modules interconnected in a cluster configuration 901 that does not reflect a one-to-one correspondence between the network and storage modules. As such, the description of a node 903 comprising one network module and one storage module should be taken as illustrative only.

Hosts 102 may be general purpose computers having a plurality of components, as described below in detail with respect to FIG. 11. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits.

Hosts 102 (and SMS 132) may be configured to interact with a node 903 in accordance with a client/server model of information delivery. That is, each client 102 may request the services of the node 903, and node 903 may return the results of the services requested by the client 102 over network 911. Hosts 102 may be configured to execute processor executable instructions, shown as application 909 for reading and writing information at storage devices 114. Such application 909 may include a database application, a financial management system, an electronic mail application or any other application type, as described above in detail.

Hosts 102 may issue packets using application 909 including file-based access protocols, such as the CIFS protocol or the NFS protocol, over TCP/IP when accessing information in the form of certain data containers. Alternatively, the client 102 may issue packets using application 909 including block-based access protocols, such as the SCSI protocol encapsulated over TCP ("iSCSI") and SCSI encapsulated over Fibre Channel ("FCP"), when accessing information in the form of other data containers, such as blocks.

In one example, one or both of network module 905 and storage module 907 execute a plurality of layers of a storage operating system 124. These layers include a file system manager that keeps track of a directory structure (hierarchy) of the data stored in storage devices 114 and manages read/write operations, i.e. executes read/write operations on storage devices in response to host 102 requests.

Figure 9B:
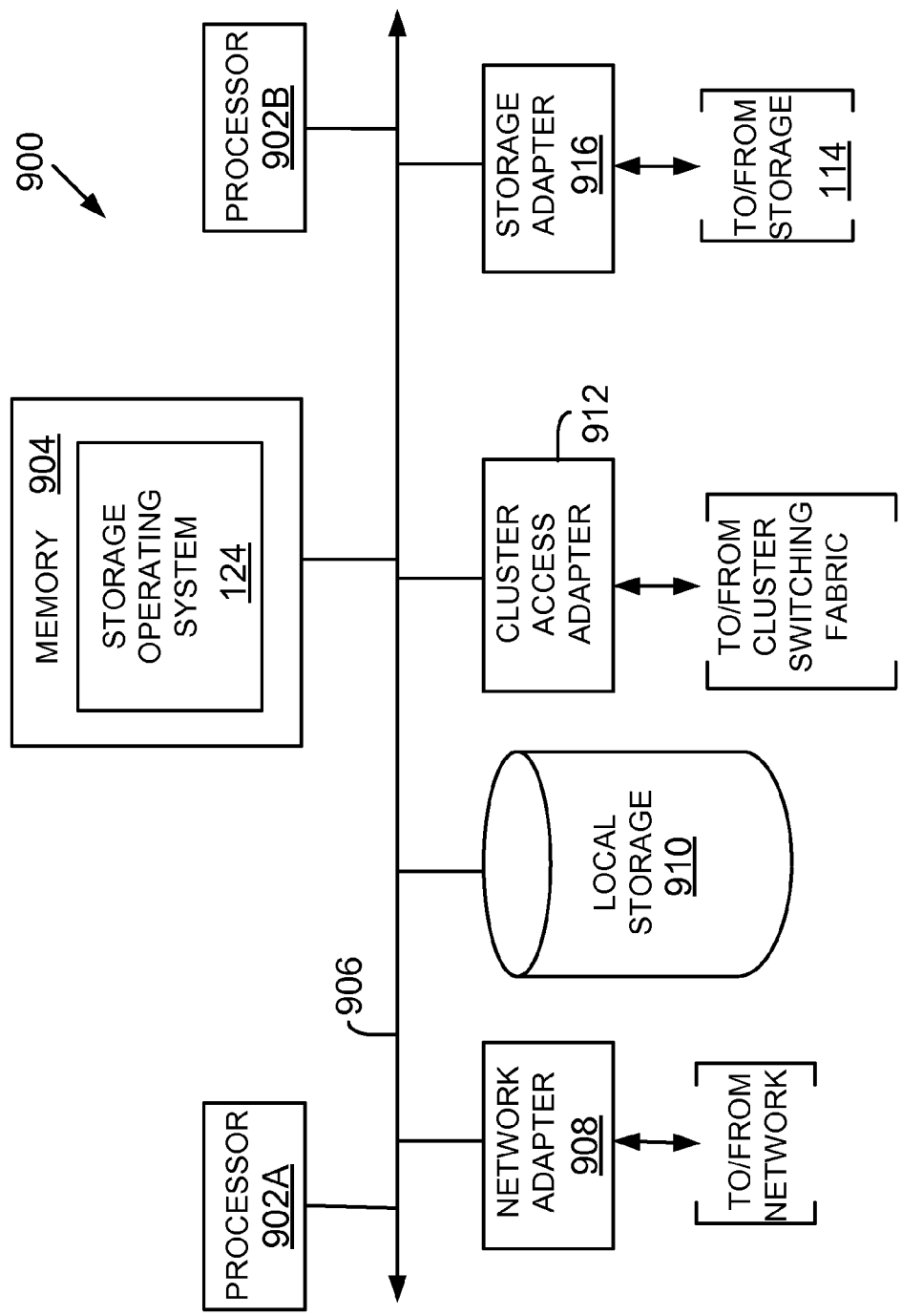
FIG. 9B shows an example of a storage system node, used according to one aspect of the present disclosure.

Storage System Node:

FIG. 9B is a block diagram of a system 900, according to one aspect. System 900 may be used by a stand-alone storage system 120 and/or a storage system node operating within a clustered storage system node for performing various storage services described above. System 900 communicates with SAL 151A and/or storage system interface 195 for providing information regarding stored objects, backups, clones, restore operations and others as described above.

System 900 may include a plurality of processors 902A and 902B, a memory 904, a network adapter 908, a cluster access adapter 912 (used for a cluster environment), a storage adapter 916 and local storage 910 interconnected by a system bus 906. The local storage 910 comprises one or more storage devices, such as disks, utilized by the processors to locally store configuration and other information.

The cluster access adapter 912 comprises a plurality of ports adapted to couple system 900 to other nodes of a cluster (not shown). In the illustrative aspect, Ethernet may be used as the clustering protocol and interconnect media, although it will be apparent to those skilled in the art that other types of protocols and interconnects may be utilized within the cluster architecture described herein.

System 900 is illustratively embodied as a dual processor storage system executing a storage operating system 124 that preferably implements a high-level module, such as a file system, to logically organize information as a hierarchical structure of named directories, files and special types of files called virtual disks on storage devices 114. However, it will be apparent to those of ordinary skill in the art that the system 900 may alternatively comprise a single or more than two processor systems.

The memory 904 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the various aspects described herein.

The storage operating system 124, portions of which is typically resident in memory and executed by the processing elements, functionally organizes the system 900 by, inter alia, invoking storage operations in support of the storage service provided by storage system 120. An example of operating system 124 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of the various aspects disclosed herein.

The network adapter 908 comprises a plurality of ports adapted to couple the system 900 to one or more clients (for example, hosts 102) over point-to-point links, wide area networks, virtual private networks implemented over a public network (Internet) or a shared local area network. The network adapter 908 thus may comprise the mechanical, electrical and signaling circuitry needed to connect storage system 120 to the network. Illustratively, the computer network 109 may be embodied as an Ethernet network or a FC network.

The storage adapter 916 cooperates with the storage operating system 124 executing on the system 900 to access information requested by the clients and management application. The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 916 comprises a plurality of ports having input/output (I/O) interface circuitry that couples to the disks over an I/O interconnect arrangement, such as a conventional high-performance, Fibre Channel link topology. In another aspect, instead of using a separate network and storage adapter, a converged adapter is used to process both network and storage traffic.

Figure 10:
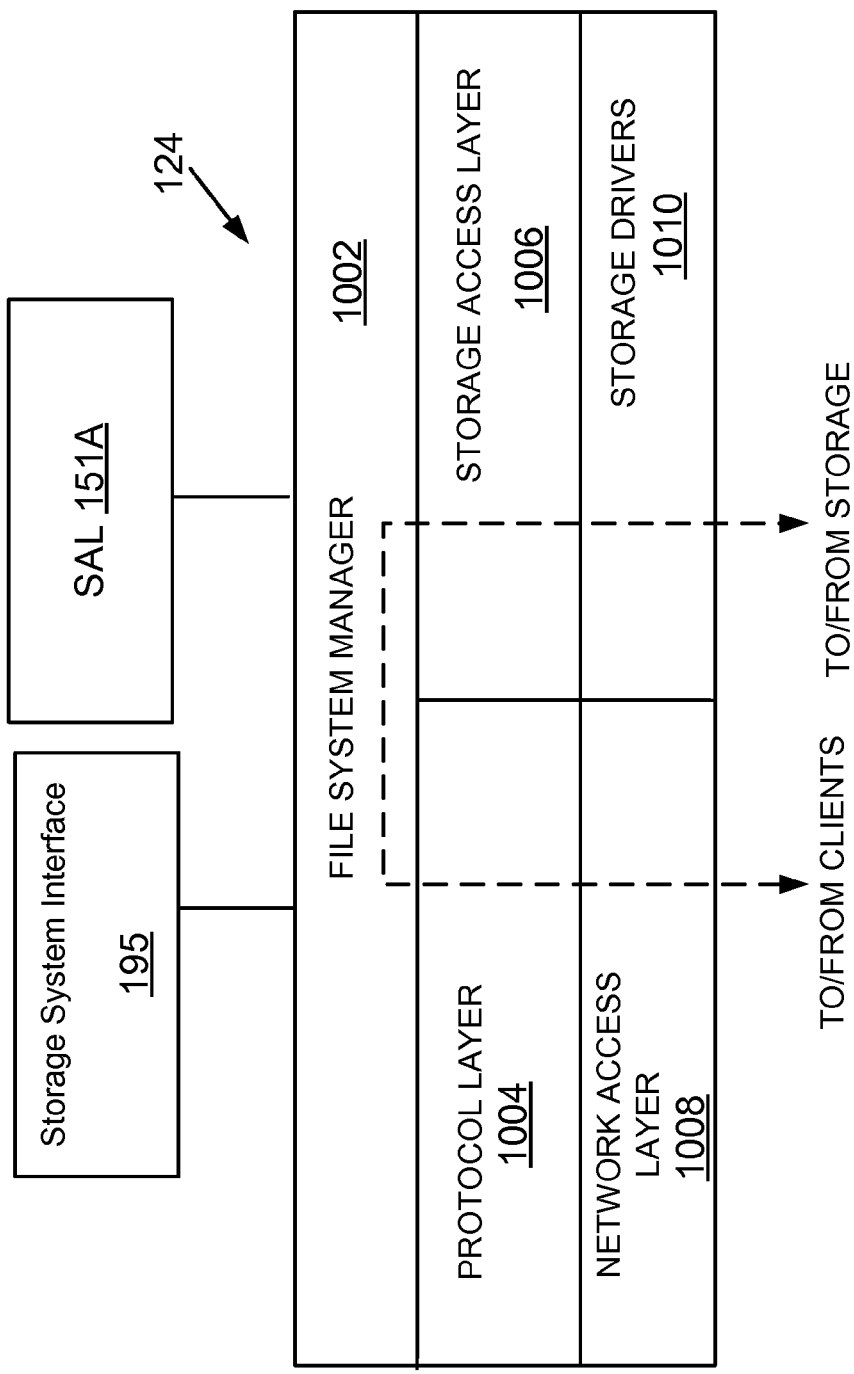
FIG. 10 shows an example of a storage operating system, used according to one aspect of the present disclosure.

Storage Operating System:

FIG. 10 illustrates a generic example of operating system 124 executed by storage system 120 and interfacing with storage system interface 195 (or SAL 151A), according to one aspect of the present disclosure. The storage operating system 124 maintains various stored objects and data containers. Storage system interface 195 and/or SAL 151A communicates with different layers of storage operating system 124 for providing storage services in system 100, described above in detail.

As an example, operating system 124 may include several modules, or "layers". These layers include a file system manager 1002 that keeps track of a directory structure (hierarchy) of the data stored in storage devices and manages read/write operations, i.e. executes read/write operations on disks in response to client requests.

Operating system 124 may also include a protocol layer 1004 and an associated network access layer 1008, to allow system 120 to communicate over a network with other systems. Protocol layer 1004 may implement one or more of various higher-level network protocols, such as NFS, CIFS, Hypertext Transfer Protocol (HTTP), TCP/IP and others, as described below.

Network access layer 1008 may include one or more drivers, which implement one or more lower-level protocols to communicate over the network, such as Ethernet. Interactions between clients (i.e. host systems/applications) and mass storage devices 114 are illustrated schematically as a path, which illustrates the flow of data through operating system 124.

The operating system 124 may also include a storage access layer 1006 and an associated storage driver layer 1010 to communicate with a storage device. The storage access layer 1006 may implement a higher-level disk storage protocol, such as RAID, while the storage driver layer 1010 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120 in response to a file system request issued by client 114.

As used herein, the term "storage operating system" generally refers to the computer-executable code operable on a computer to perform a storage function that manages data access and may, in the case of system 120, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the various aspects described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present aspects may be utilized with any suitable file system, including a write in place file system.

Figure 11:
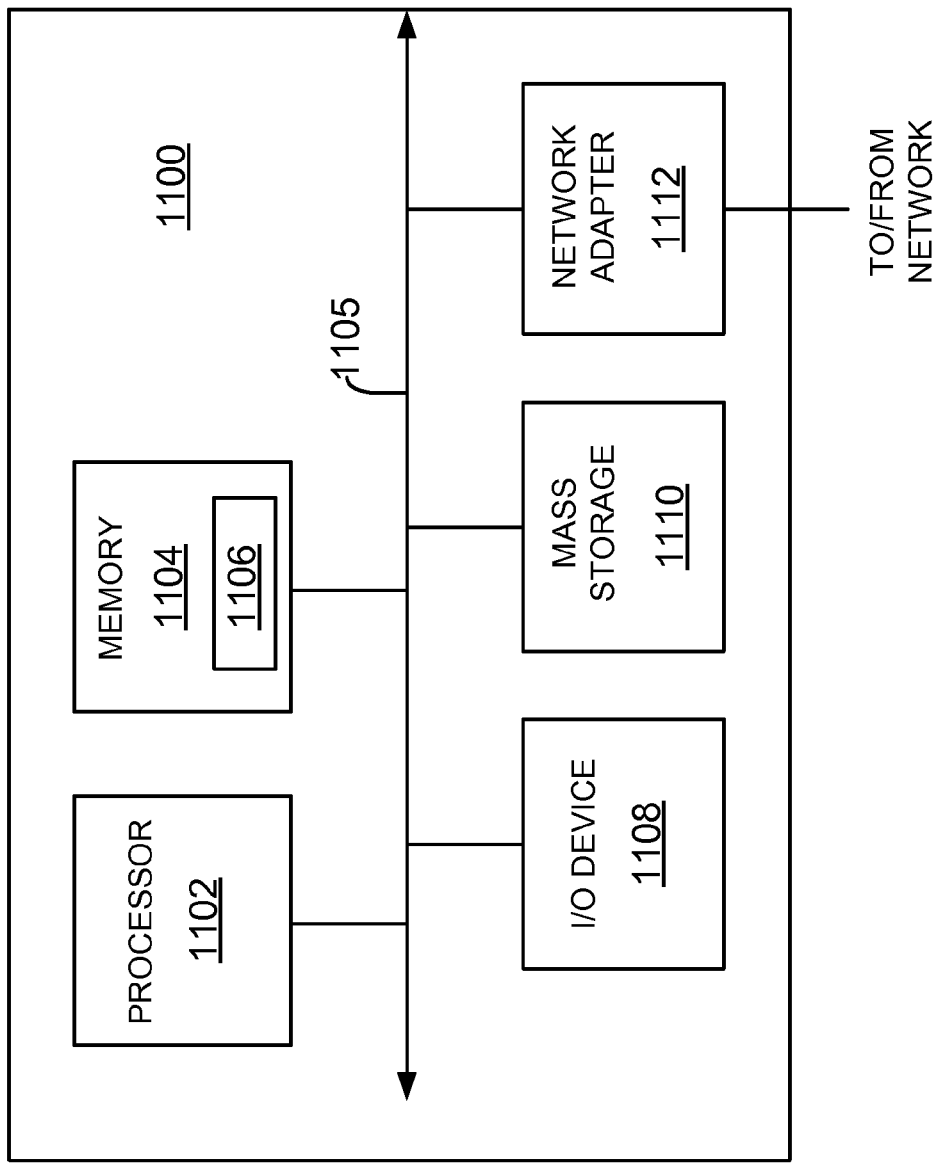
FIG. 11 shows an example of a processing system, used according to one aspect of the present disclosure.

Processing System:

FIG. 11 is a high-level block diagram showing an example of the architecture of a processing system, at a high level, in which executable instructions as described above can be implemented. The processing system 1100 can represent SMS 132, host system 102, VMM 106, virtual management console 103, and others. Note that certain standard and well-known components which are not germane to the various aspects of this disclosure are not shown in FIG. 11.

The processing system 1100 includes one or more processors 1102 and memory 1104, coupled to a bus system 1105. The bus system 1105 shown in FIG. 11 is an abstraction that represents any one or more separate physical buses and/or point-to-point connections, connected by appropriate bridges, adapters and/or controllers. The bus system 1105, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 1102 are the central processing units (CPUs) of the processing system 1100 and, thus, control its overall operation. In certain aspects, the processors 1102 accomplish this by executing programmable instructions stored in memory 1104. A processor 1102 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 1104 represents any form of random access memory (RAM), read-only memory (ROM), flash memory, or the like, or a combination of such devices. Memory 1104 includes the main memory of the processing system 1100. Instructions 1106 which implement the various techniques/process flows introduced above may reside in and may be executed (by processors 1102) from memory 1104. It is noteworthy that portions of instructions 1106 may be executed by different processors out of different memory devices.

Also connected to the processors 1102 through the bus system 1105 are one or more internal mass storage devices 1110, and a network adapter 1112. Internal mass storage devices 1110 may be or may include any conventional medium for storing large volumes of data in a non-volatile manner, such as one or more magnetic or optical based disks. The network adapter 1112 provides the processing system 1100 with the ability to communicate with remote devices (e.g., storage servers) over a network and may be, for example, an Ethernet adapter, a FC adapter, or the like. The processing system 1100 also includes one or more input/output (I/O) devices 1108 coupled to the bus system 1105.

The I/O devices 1108 may include, for example, a display device, a keyboard, a mouse, etc.

Cloud Computing:

The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive aspects.

Thus, a method and apparatus for managing storage services has been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
obtaining network interface information by a processor executable plugin executed by a computing device from a storage system node managing stored information;
filtering logical interface information based on a protocol used by a processor executable application that uses the storage system node to store information;
obtaining aliases for the logical interface information from a domain name server, when available; and
storing the filtered logical interface information and associated aliases at a network identifier cache managed by the plugin; wherein the network identifier cache is used by the plugin to verify network interface information as associated with a data path for a data container stored at a storage device.

2. The method of claim 1, wherein the data path is provided to the plugin by a processor executable management layer executed by the computing device for providing storage services and the data path includes a file server identifier, a data container name and a logical share associated with the data container.

3. The method of claim 2, further comprising:
using the network identifier cache by the plugin to find a storage system node associated with the file server identifier; and
obtaining alias information from the domain name server by the plugin, when the network identifier cache does not include an entry associated with the file server identifier;
wherein the domain name server manages network addresses and aliases for a plurality of storage system nodes within a cluster.

4. The method of claim 3, further comprising:
generating a storage hierarchy for the data container by the plugin, where the storage hierarchy associates the data container with the logical share and the storage system node.

5. The method of claim 4, wherein the storage hierarchy associates the data container with a data container group that includes other containers associated with the logical share and managed by the storage system node.

6. The method of claim 4, wherein the storage hierarchy includes the data container, a file system, a logical unit number (LUN) and a virtual disk, when storage is presented in a virtual environment.

7. The method of claim 1, wherein the logical share is a Server Message Block (SMB) share and the plugin is a file system plugin.

8. A non-transitory, machine readable storage medium having stored thereon instructions for performing a method, comprising machine executable code which when executed by at least one machine, causes the machine to:
obtain network interface information by a processor executable plugin executed by a computing device from a storage system node managing stored information;
filter logical interface information based on a protocol used by a processor executable application that uses the storage system node to store information;
obtain aliases for the logical interface information from a domain name server, when available; and
store the filtered logical interface information and associated aliases at a network identifier cache managed by the plugin; wherein the network identifier cache is used by the plugin to verify network interface information as associated with a data path for a data container stored at a storage device.

9. The storage medium of claim 8, wherein the data path is provided to the plugin by a processor executable management layer executed by the computing device for providing storage services and the data path includes a file server identifier, a data container name and a logical share associated with the data container.

10. The storage medium of claim 9, wherein the machine executable code, further causes the machine to:
use the network identifier cache by the plugin to find a storage system node associated with the file server identifier; and obtain alias information from the domain name server by the plugin, when the network identifier cache does not include an entry associated with the file server identifier, wherein the domain name server manages network addresses and aliases for a plurality of storage system nodes.

11. The storage medium of claim 10, wherein the machine executable code, further causes the machine to:
generate a storage hierarchy for the data container by the plugin, where the storage hierarchy associates the data container with the logical share and the storage system node.

12. The storage medium of claim 11, wherein the storage hierarchy associates the data container with a data container group that includes other containers associated with the logical share and managed by the storage system node.

13. The storage medium of claim 11, wherein the storage hierarchy includes the data container, a file system, a logical unit number (LUN) and a virtual disk, when storage is presented in a virtual environment.

14. The storage medium of claim 8, wherein the logical share is a Server Message Block (SMB) share and the plugin is a file system plugin.

15. A system, comprising:
a memory containing machine readable medium comprising machine executable code having stored thereon instructions; and a processor module coupled to the memory, configured to execute the machine executable code of a plugin to:
obtain network interface information from a storage system node managing stored information;
filter logical interface information based on a protocol used by a processor executable application that uses the storage system node to store information;
obtain aliases for the logical interface information from a domain name server, when available; and
store the filtered logical interface information and associated aliases at a network identifier cache managed by the plugin; wherein the network identifier cache is used by the plugin to verify network interface information as associated with a data path for a data container stored at a storage device.

16. The system of claim 15, wherein the data path is provided to the plugin by a processor executable management layer executed by a computing device for providing storage services and the data path includes a file server identifier, a data container name and a logical share associated with the data container.

17. The system of claim 16, wherein the machine executable code, further causes the machine to:
use the network identifier cache by the plugin to find a storage system node associated with the file server identifier; and
obtain alias information from the domain name server by the plugin, when the network identifier cache does not include an entry associated with the file server identifier; wherein the domain name server manages network addresses and aliases for a plurality of storage system nodes within a cluster.

18. The system of claim 17, wherein the machine executable code, further causes the machine to:
generate a storage hierarchy for the data container by the plugin, where the storage hierarchy associates the data container with the logical share and the storage system node.

19. The system of claim 18, wherein the storage hierarchy is used to associate the data container with a data container group that includes other containers associated with the logical share and managed by the storage system node.

20. The system of claim 18, wherein the storage hierarchy includes the data container, a file system, a logical unit number (LUN) and a virtual disk, when storage is presented in a virtual environment.

* * * * *